(12) United States Patent
Nishida et al.

(10) Patent No.: US 7,755,978 B2
(45) Date of Patent: Jul. 13, 2010

(54) RECORDING HEAD AND RECORDER

(75) Inventors: Naoki Nishida, Kusatsu (JP); Hiroaki Ueda, Suita (JP); Manami Kuiseko, Kyoto (JP); Koujirou Sekine, Ibaraki (JP); Kenji Konno, Sakai (JP); Masahiro Okitsu, Higashiosaka (JP); Hiroshi Hatano, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 256 days.

(21) Appl. No.: 11/717,581

(22) Filed: Mar. 13, 2007

(65) Prior Publication Data

US 2007/0230288 A1  Oct. 4, 2007

(30) Foreign Application Priority Data

Mar. 14, 2006  (JP) .............................. 2006-068879

(51) Int. Cl.
  *G11B 11/00*  (2006.01)
(52) U.S. Cl. ................................. 369/13.13; 369/13.33
(58) Field of Classification Search ............... 369/13.13, 369/13.24, 13.32–13.34, 44.12, 112.27–112.29, 369/300
  See application file for complete search history.

(56) References Cited

U.S. PATENT DOCUMENTS

| | | | |
|---|---|---|---|
| 6,724,718 B1 * | 4/2004 | Shinohara et al. ........... | 369/300 |
| 6,768,556 B1 | 7/2004 | Matsumoto et al. | |
| 7,330,404 B2 | 2/2008 | Peng et al. | |
| 7,483,140 B1 * | 1/2009 | Cho et al. .................... | 356/445 |
| 7,529,158 B2 | 5/2009 | Matsumoto et al. | |
| 2002/0122376 A1 * | 9/2002 | Song .......................... | 369/300 |
| 2004/0085862 A1 * | 5/2004 | Matsumoto et al. ....... | 369/13.33 |
| 2005/0078565 A1 | 4/2005 | Peng et al. | |
| 2005/0135008 A1 * | 6/2005 | Challener et al. ........... | 360/128 |
| 2006/0133230 A1 * | 6/2006 | Buechel et al. ........... | 369/44.23 |
| 2009/0207703 A1 | 8/2009 | Matsumoto et al. | |

FOREIGN PATENT DOCUMENTS

| | | |
|---|---|---|
| JP | 2001-255254 A | 9/2001 |
| JP | 2004-151046 A | 5/2004 |
| JP | 2005-116155 A | 4/2005 |

* cited by examiner

*Primary Examiner*—Thang V Tran
*Assistant Examiner*—Brian Butcher
(74) *Attorney, Agent, or Firm*—Brinks Hofer Gilson & Lione

(57) ABSTRACT

A recorder has a recording head which uses light for information recording to a recording medium. The recording head has a slider and an optical waveguide. The slider moves relative to the recording medium while floating thereon. The optical waveguide is provided in the slider and has a refractive index difference of 20% or more between a core and a cladding.

30 Claims, 17 Drawing Sheets

RECORDING HEAD AND RECORDER

This application is based on Japanese Patent Application No. 2006-068879 filed on Mar. 14, 2006, the contents of which are hereby incorporated by reference.

BACKGROUND OF THE INVENTION

1. Field of the Invention

The present invention relates to a recording head and a recorder, and, for example, to a micro-optical recording head which uses light for information recording and a micro-optical recorder using such a micro-optical recording head, and to an optically assisted magnetic recording head which uses a magnetic field and light for information recording and an optically assisted magnetic recorder using such an optically assisted magnetic recording head.

2. Description of Related Art

In a magnetic recording method, a magnetic bit is remarkably susceptible, at high recording density, to the outside temperature and the like, thus requiring a recording medium having a high coercive force. Use of such a recording medium requires a large magnetic field at recording. The magnetic field generated by the recording head has its upper limit determined by the saturation magnetic flux density, and this value is close to the material limit and thus cannot be expected to increase dramatically. Thus, a method is suggested in which local heating is performed at recording to thereby cause magnetic softening, recording is performed when the coercive force becomes small, then heating is stopped and self-cooling is then attempted to thereby ensure the stability of a recorded magnetic bit. This method is called a heat assisted magnetic recording system.

With the heat assisted magnetic recording method, it is preferable that a recording medium be heated instantaneously. Moreover, contact between a device to be heated and the recording medium are never permitted. Thus, heating is generally performed by use of light absorption, and a method using light for heating is called an optically assisted method. To perform ultra high density recording by the optically assisted method, the required spot diameter is approximately 20 nm, but light cannot be condensed to such a size due to diffraction limitation imposed on a normal optical system. Thus, several methods of heating by using near-field light as non-transmitted light have been proposed (see patent document 1 and the like). In this method, laser light of a suitable wavelength is condensed by an optical system and then irradiated to metal of several tens of nanometers in size (called plasmon probe) to thereby generate near-field light, which is then used as heating means.

[Patent Document 1] JP-A-2005-116155

With a general magnetic recorder (for example, hard disk device), a plurality of recording disks are laid in narrow space with a clearance of 1 mm or below therebetween. Thus, the thickness of a magnetic recording head is limited. The optically assisted magnetic recording head described in patent document 1 and a typical magneto-optic recording head (MO) have a large optical system arranged on the back surface thereof, and thus the magnetic recording head fails to support a magnetic recorder whose magnetic recording head described above is limited in thickness. From this point, very thin light guiding means and condensing means are required for the optically assisted magnetic recording head.

Upon formation of a light spot on the disk by a typical lens or an SIL (solid immersion lens), large NA (numerical aperture) needs to be provided to obtain a small spot size. This means that the angle of rays of light directed to the condensing point is large. An optically assisted section in the optically assisted magnetic recording head needs to exist under the presence of a magnetic recording section and a magnetic reproduction section used in a typical hard disk device; thus, as described above, large NA causes light to interfere with the magnetic recording section and the magnetic reproduction section and also leads to upsizing of the beam diameter and the magnetic recording head.

SUMMARY OF THE INVENTION

In view of the circumstance described above, the present invention has been made, and it is an object of the invention to provide a small-size recording head capable of high-density information recording on a small light spot and a recorder using such a recording head.

According to one aspect of the invention, a recording head which uses light for information recording to a recording medium has: a slider which moves relative to the recording medium while floating thereon; and an optical waveguide which is provided in the slider and which has a refractive index difference of 20% or more between a core and a cladding.

According to another aspect of the invention, a recording head which uses light for information recording to a recording medium has: a slider which moves relative to the recording medium while floating thereon; an optical waveguide provided in the slider; and a plasmon probe for near-field light generation provided at or near light exit position of the optical waveguide.

According to still another aspect of the invention, a recording head which performs information recording to a recording medium has: a slider which moves relative to the recording medium while floating thereon; an optical waveguide provided in the slider; a plasmon probe for near-field light generation so provided as to face the recording medium at or near light exit position of the optical waveguide; and a magnetic recording element which performs information writing by magnetism.

DETAILED DESCRIPTION OF PREFERRED EMBODIMENTS

Hereinafter, an optically assisted magnetic recording head according to the present invention, a magnetic recorder provided therewith, and the like will be described, with reference to the accompanying drawings. Note that the same or corresponding portions among embodiments and the like are provided with the same numerals and thus their overlapping description will be omitted as appropriate.

Figure 1:
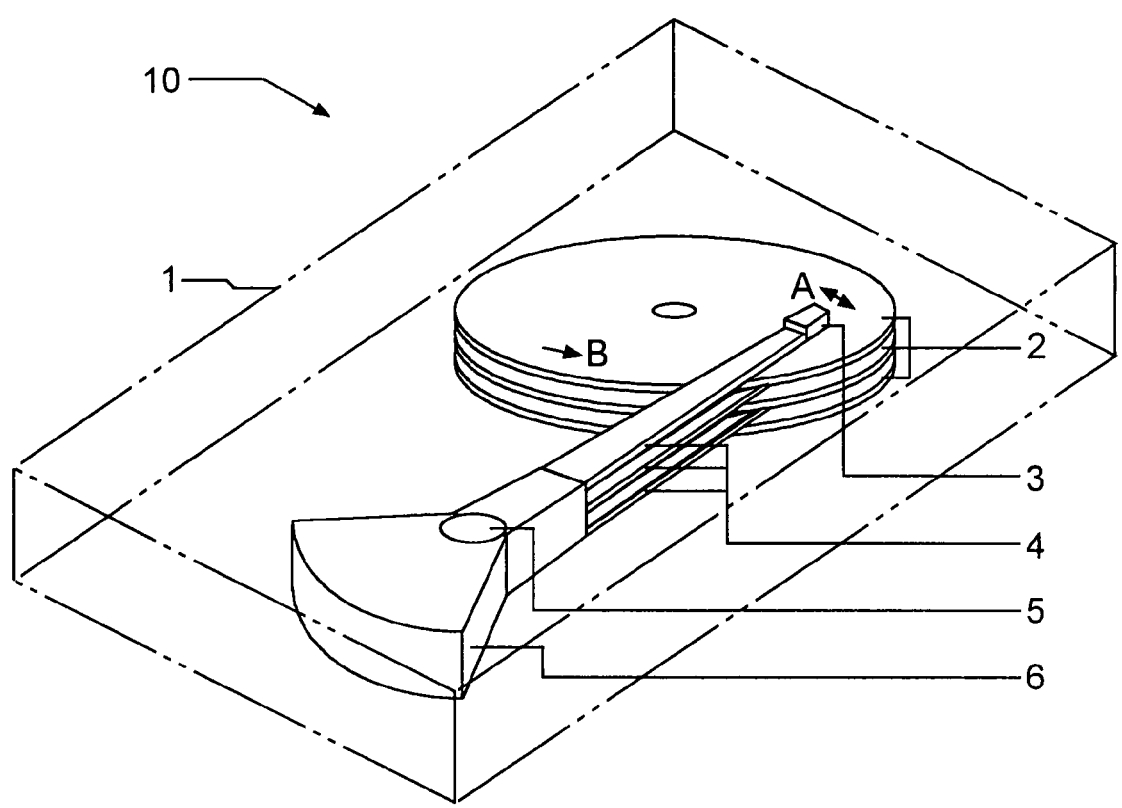
FIG. 1 is a perspective view showing an example of schematic configuration of an optically assisted magnetic recorder according to the present invention.

FIG. 1 shows an example of schematic configuration of a magnetic recorder (for example, hard disk device) loaded with an optically assisted magnetic recording head. This magnetic recorder 10 is so configured as to have in a case 1: a recording disk 2 (magnetic recording medium); a suspension 4 so provided as to be rotatable in a direction of an arrow A (tracking direction) about a spindle 5 as a supporting point; a tracking actuator 6 fitted to the suspension 4; an optically assisted magnetic recording head 3 fitted to the tip end section of the suspension 4; and a motor, not shown, for rotating the disk 2 in a direction of an arrow B, in which the magnetic recording head 3 moves relative to the disk 2 while floating thereon.

The magnetic recording head 3 is a micro-optical recording head which uses light for information recording on the disk 2, and includes: a light source section formed of a semiconductor laser, an optical fiber, and the like; an optically assisted section for spot-heating a recording target portion of the disk 2 with near-infrared laser light; an optical system which guides near-infrared laser light from the light source section to the optically assisted section; a magnetic recording section which writes magnetic information to the recording target of the disk 2; and a magnetic reproduction section which reads magnetic information recorded on the disk 2. The semiconductor laser forming the light source section is a near-infrared light source, and laser light of a near-infrared wavelength (1550 nm, 1310 nm, or the like) exiting from the semiconductor laser is guided to a predetermined position by the optical fiber. The near-infrared laser light exiting from the light source section is guided to the optically assisted section by the optical system, passes through an optical waveguide of the optically assisted section, and then exits from the magnetic recording head 3. When the near-infrared laser light exiting from the optically assisted section is irradiated as a micro light spot to the disk 2, the temperature of the irradiated portion of the disk 2 temporarily increases, thereby decreasing the coercive force of the disk 2. To this irradiated portion where the coercive force has decreased, magnetic information is written by the magnetic recording section. The details of this magnetic recording head 3 will be described below.

FIGS. 2 to 5 show optically in cross sections the first to fourth embodiments, respectively, showing detailed optical configuration (optical surface shape, optical path, and the like) of the magnetic recording head 3. Moreover, construction data (Examples 1 to 4) of the first to fourth embodiments will be shown below. In the construction data of each of the embodiments, ri (i=0, 1, 2, 3, ...) denotes a radius of curvature (mm) of the i-th surface Si (i=0, 1, 2, 3, ...) counted from the light source section side, di (i=0, 1, 2, 3, ...) denotes the i-th axial distance (mm) counted from the light source section side, Ni (i=1, 2, ...) denotes an refractive index for an applied wavelength of the i-th medium counted from the light source section side, and x-axis slope ai (i=0, 1, 2, 3, ...) and y-axis decentering bi (i=0, 1, 2, 3, ...) show a slope angle (°) and the amount of decentering (mm), respectively, of the surface Si in a mutually orthogonal xy coordinate system. The light source position corresponds to the exit end surface of the optical fiber 14. NA (numerical aperture) and working wavelength of the light source are also shown.

Example 1

Constructed Data of the First Embodiment

NA of the light source = 0.083333
Working wavelength: 1.31 (μm)

| Surface | Radius of Curvature | Axial Distance | Refractive Index | x-axis Slope | y-axis Decentering |
|---|---|---|---|---|---|
| S0 | r0 = ∞ | d0 = 0.244 | — | a0 = 0 | b0 = 0 (Light source) |
| S1 | r1 = 0.125 | d1 = 0.25 | N1 = 1.50358291 | a1 = 0 | b1 = 0 |
| S2 | r2 = −0.125 | d2 = 0.03 | — | a2 = 0 | b2 = 0 |
| S3 | r3 = — | d3 = 0 | — | a3 = 35.26 | b3 = 0 |
| S4 | r4 = ∞ | d4 = 0.6 | N2 = 3.51136585 | a4 = 0 | b4 = 0 |
| S5 | r5 = — | d5 = 0 | — | a5 = −70.528 | b5 = 0 |
| S6 | r6 = — | d6 = 0 | — | a6 = 0 | b6 = 0.20388742 |
| S7 | r7 = ∞ | d7 = 0 | — | a7 = 0 | b7 = 0 (Total reflection surface) |
| S8 | r8 = ∞ | d8 = −0.8 | N3 = 3.51136585 | a8 = 0 | b8 = 0 |
| S9 | r9 = — | d9 = 0 | — | a9 = −61.03 | b9 = 0 |

-continued

NA of the light source = 0.083333
Working wavelength: 1.31 (μm)

| Surface | Radius of Curvature | Axial Distance | Refractive Index | x-axis Slope | y-axis Decentering |
|---|---|---|---|---|---|
| S10 | r10 = — | d10 = 0 | — | a10 = 0 | b10 = −0.70013749 |
| S11 | r11 = ∞ | d11 = 0 | N4 = 3.51136585 | a11 = 0 | b11 = 0 |
| S12 | r12 = ∞ | | | a12 = 0 | b12 = 0 |

Example 2

Constructed Data of the Second Embodiment

NA of the light source = 0.083333
Working wavelength: 1.31 (μm)

| Surface | Radius of Curvature | Axial Distance | Refractive Index | x-axis Slope | y-axis Decentering |
|---|---|---|---|---|---|
| S0 | r0 = ∞ | d = 0.1 | — | a0 = 0 | b0 = 0 (Light source) |
| S1 | r1 = 0.075 | d1 = 0.15 | N1 = 1.75030841 | a1 = 0 | b1 = 0 |
| S2 | r2 = −0.075 | d2 = 0.02 | — | a2 = 0 | b2 = 0 |
| S3 | r3 = — | d3 = 0 | — | a3 = 35.26 | b3 = 0 |
| S4 | r4 = ∞ | d4 = 0.2 | N2 = 3.51136585 | a4 = 0 | b4 = 0 |
| S5 | r5 = — | d5 = 0 | — | a5 = −70.528 | b5 = 0 |
| S6 | r6 = — | d6 = 0 | — | a6 = 0 | b6 = 0.067962472 |
| S7 | r7 = ∞ | d7 = 0 | — | a7 = 0 | b7 = 0 (Total reflection surface) |
| S8 | r8 = ∞ | d8 = −0.4 | N3 = 3.51136585 | a8 = 0 | b8 = 0 |
| S9 | r9 = — | d9 = 0 | — | a9 = −61.03 | b9 = 0 |
| S10 | r10 = — | d10 = 0 | — | a10 = 0 | b10 = −0.35006874 |
| S11 | r11 = ∞ | d11 = 0 | N4 = 3.51136585 | a11 = 0 | b11 = 0 |
| S12 | r12 = ∞ | | | a12 = 0 | b12 = 0 |

Example 3

Constructed Data of the Third Embodiment

NA of the light source = 0.083333
Working wavelength: 1.31 (μm)

| Surface | Radius of Curvature | Axial Distance | Refractive Index | x-axis Slope | y-axis Decentering |
|---|---|---|---|---|---|
| S0 | r0 = ∞ | d0 = 0.0402565 | — | a = 0 | b0 = 0 (Light source) |
| S1 | r1 = 0.075 | d1 = 0.15 | N1 = 1.50358291 | a1 = 0 | b1 = 0 |
| S2 | r2 = −0.075 | d2 = 0.005 | — | a2 = 0 | b2 = 0 |
| S3 | r3 = — | d3 = 0 | — | a3 = 42.4 | b3 = 0 |
| S4 | r4 = — | d4 = 0 | — | a4 = 0 | b4 = 0.04259 |
| S5 | r5 = 0.0466425 | d5 = 0.0466425 | N2 = 1.50358291 | a5 = 0 | b5 = 0 |
| S6 | r6 = ∞ | d6 = 0 | N3 = 1.50358291 | a6 = 0 | b6 = 0 |
| S7 | r7 = ∞ | d7 = 0.3 | N4 = 3.51136585 | a7 = 0 | b7 = 0 |
| S8 | r8 = — | d8 = 0 | — | a8 = −70.528779 | b8 = 0 |
| S9 | r9 = — | d9 = 0 | — | a9 = 0 | b9 = 0.14647875 |
| S10 | r10 = ∞ | d10 = 0 | — | a10 = 0 | b10 = 0 (Total reflection surface) |
| S11 | r11 = ∞ | d11 = −0.25 | N5 = 3.51136585 | a11 = 0 | b11 = 0 |
| S12 | r12 = — | d12 = 0 | — | a12 = −54.738842 | b12 = 0 |
| S13 | r13 = — | d13 = 0 | — | a13 = 0 | b13 = −0.20163192 |
| S14 | r14 = ∞ | d14 = 0 | N6 = 3.51136585 | a14 = 0 | b14 = 0 |
| S15 | r15 = ∞ | | | a15 = 0 | b15 = 0 |

Example 4

Constructed Data of the Fourth Embodiment

NA of the light source = 0.083333
Working wavelength: 1.31 (μm)

| Surface | Radius of Curvature | Axial Distance | Refractive Index | x-axis Slope | y-axis Decentering |
|---|---|---|---|---|---|
| S0 | r0 = ∞ | d0 = 0.293245 | — | a0 = 0 | b0 = 0 (Light source) |
| S1 | r1 = 0.15 | d1 = 0.3 | N1 = 1.50358291 | a1 = 0 | b1 = 0 |
| S2 | r2 = −0.15 | d2 = 0.05 | — | a2 = 0 | b2 = 0 |
| S3 | r3 = — | d3 = 0.035 | — | a3 = −54.73561 | b3 = 0 |
| S4 | r4 = — | d4 = 0 | — | a4 = 0 | b4 = −0.049497475 |
| S5 | r5 = ∞ | d5 = 0 | — | a5 = 0 | b5 = 0 (Total Reflection surface) |
| S6 | r6 = ∞ | d6 = 0 | — | a5 = 0 | b6 = 0 |
| S7 | r7 = — | d7 = −0.15 | — | a7 = −54.73561 | b7 = 0 |
| S8 | r8 = — | d8 = 0 | — | a8 = 0 | b8 = 0 |
| S9 | r9 = ∞ | d9 = 0 | — | a9 = 0 | b9 = 0 |
| S10 | r10 = ∞ | | | a10 = 0 | b10 = 0 |

Figure 2:
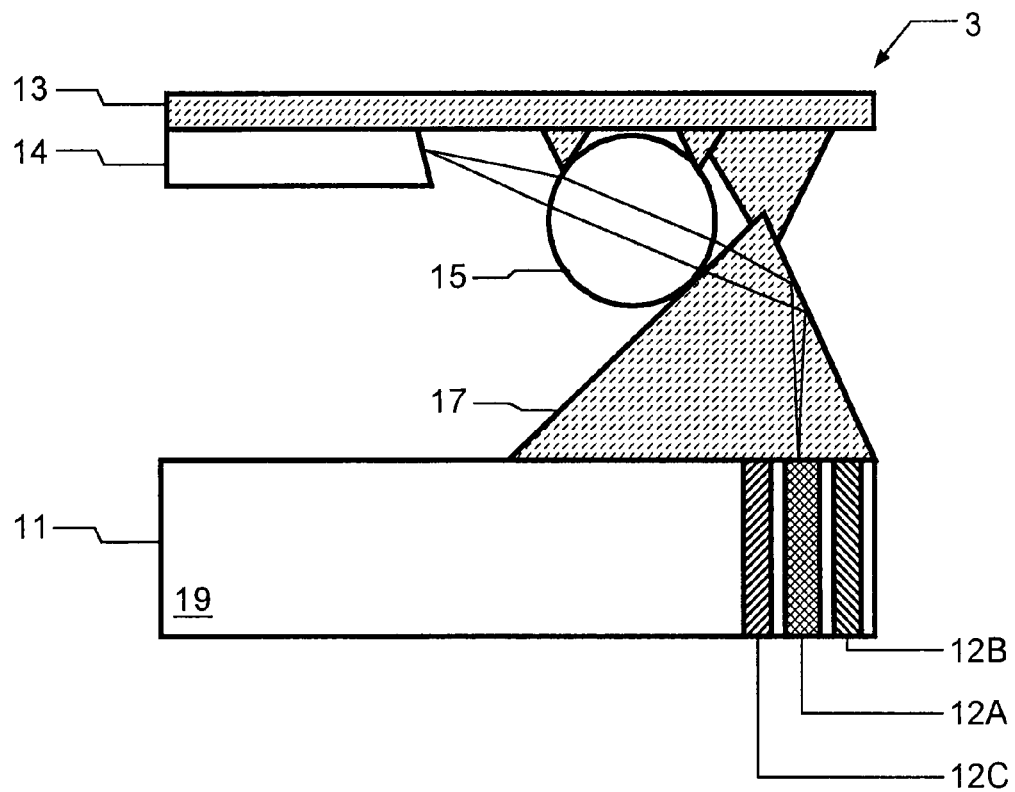
FIG. 2 is a cross section showing a first embodiment of the optically assisted magnetic recording head.
Figure 3:
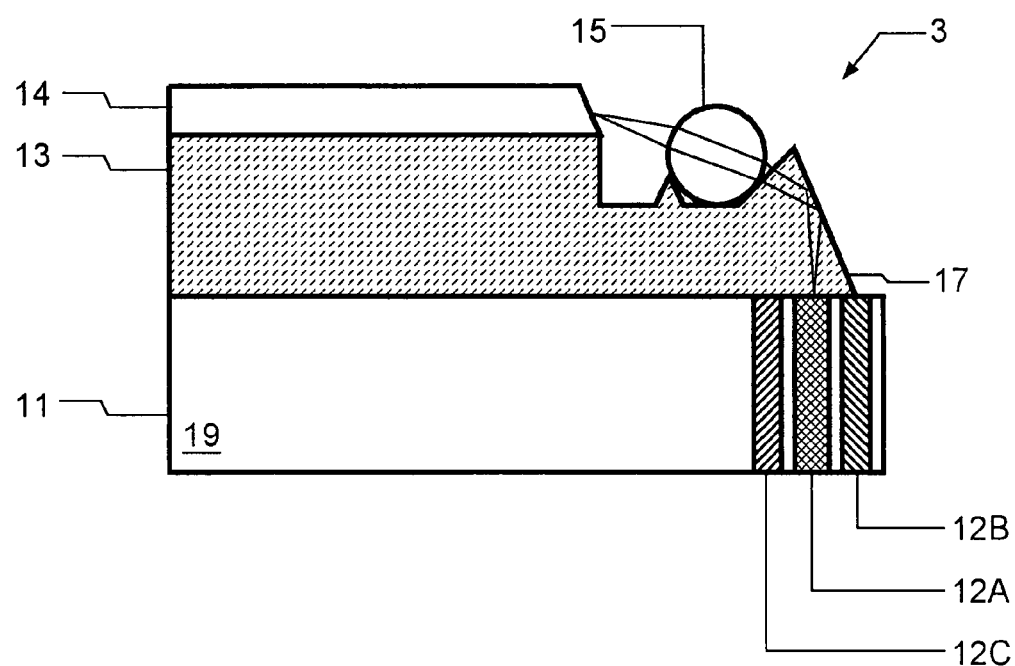
FIG. 3 is a cross section showing a second embodiment of the optically assisted magnetic recording head.
Figure 4:
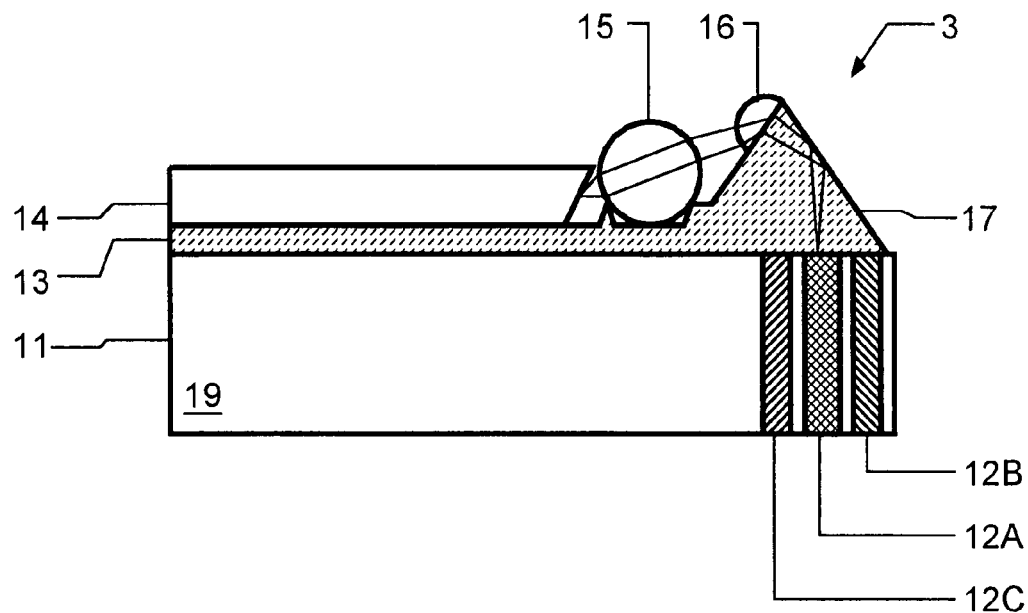
FIG. 4 is a cross section showing a third embodiment of the optically assisted magnetic recording head.
Figure 5:
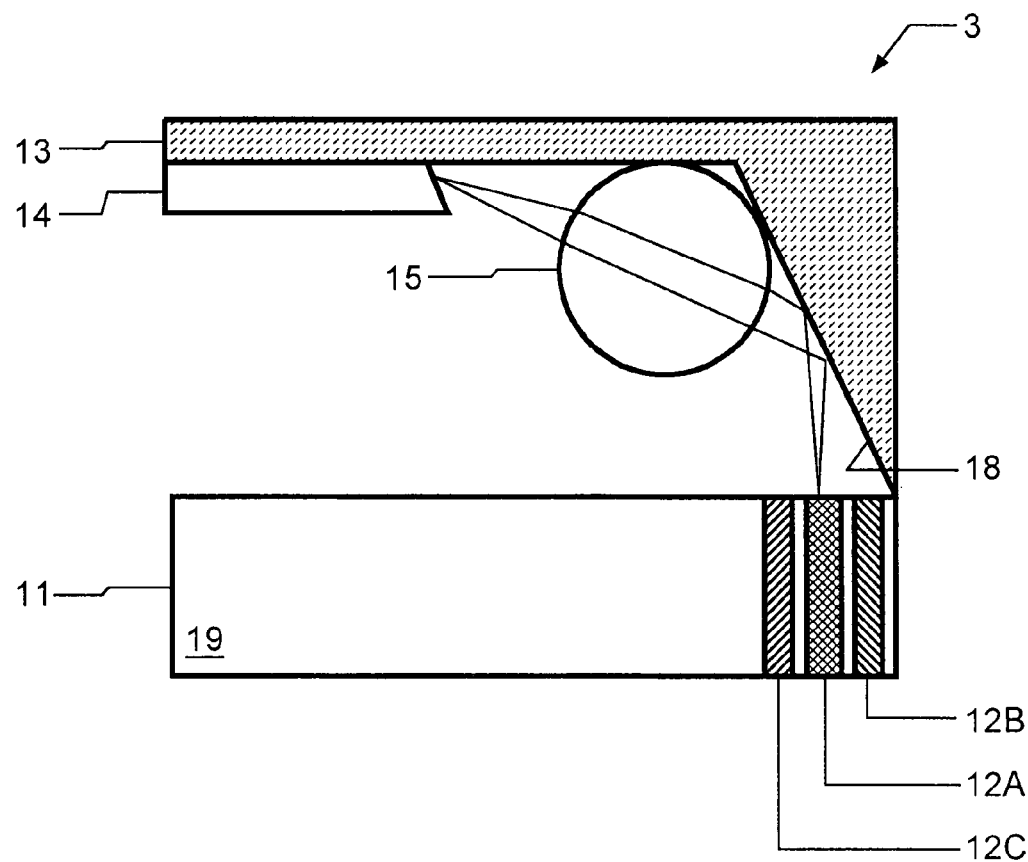
FIG. 5 is a cross section showing a fourth embodiment of the optically assisted magnetic recording head.

The first to third embodiments (FIGS. 2 to 4) relate to a magnetic recording head of the type with total reflection conducted in the optical path, and the fourth embodiment (FIG. 5) relates to a magnetic recording head without total reflection conducted in the optical path, any of which corresponds to the magnetic recording head 3 in FIG. 1. In FIGS. 2 to 5, numeral 11 denotes a slider, numeral 12A denotes an optically assisted section having an optical waveguide, numeral 12B denotes a magnetic recording section, numeral 12C denotes a magnetic reproduction section, numeral 13 denotes a silicon bench, numeral 14 denotes an optical fiber, numeral 15 denotes a ball lens, and numeral 19 denotes a substrate. In FIGS. 2 to 4, numeral 17 denotes a micro prism as a deflecting element; in FIG. 4, numeral 16 denotes a hemisphere lens; and in FIG. 5, numeral 18 denotes a micro mirror as a deflecting element.

In the first to fourth embodiments, the magnetic recording section 12B is a magnetic recording element which writes magnetic information to the disk 2, the magnetic reproduction section 12C is a magnetic reproduction element which reads magnetic information recorded in the disk 2, and the optically assisted section 12A is an optically assisted element which spot-heats the recording target portion of the disk 2 with near-infrared laser light. In each of the embodiments, from the inflow side to the outflow side of the recording region of the disk 2, the magnetic reproduction section 12C, the optically assisted section 12A, the magnetic recording section 12B are arranged in this order, although not limited thereto. It is only necessary that the magnetic recording section 12B be located immediately after the outflow side of the optically assisted section 12A. Thus, for example, the optically assisted section 12A, the magnetic recording section 12B, and the magnetic reproduction section 12C may be arranged in this order.

The magnetic recording head 3 of the first and second embodiments is composed of: the light source section including the optical fiber 14; the optical system composed of the ball lens 15 and the micro prism 17 for guiding near-infrared laser light from the optical fiber 14 to the optically assisted section 12A; the silicon bench 13 fitted with the light source section and the optical system; and the slider 11 which moves relative to the disk 2 (FIG. 1) while floating thereon under the condition that the silicon bench 13 is fitted. The magnetic recording head 3 of the third embodiments composed of: the light source section including the optical fiber 14; the optical system composed of the ball lens 15, the hemisphere lens 16, and the micro prism 17 for guiding near-infrared laser light from the optical fiber 14 to the optically assisted section 12A; the silicon bench 13 fitted with the light source section and the optical system; and the slider 11 which moves relative to the disk 2 (FIG. 1) while floating thereon under the condition that the silicon bench 13 is fitted. The magnetic recording head 3 of the fourth embodiment is composed of: the light source section including the optical fiber 14; an optical system composed of the ball lens 15 and the micro mirror 18 for guiding near-infrared laser light from the optical fiber 14 to the optically assisted section 12A; the silicon bench 13 fitted with the light source section and the optical system; and the slider 11 which moves relative to the disk 2 (FIG. 1) while floating thereon under the condition that the silicon bench 13 is fitted. In the slider 11 in the first to fourth embodiments, the optically assisted section 12A, the magnetic recording section 12B, and the magnetic reproduction section 12C are so provided as to be integrated together with the slider 11. In the first to third embodiments, the micro prism 17 is so configured as to be integrated with the silicon bench 13 while the micro mirror 18 is so configured as to be integrated with the silicon bench 13 in the fourth embodiment.

The optical configuration of the first embodiment (FIG. 2) will be described. The silicon bench 13 is provided with a V-groove, not shown, formed by anisotropic etching, and the optical fiber 14 of 125 μm in diameter is set in the V-groove. The light exit side end surface of the optical fiber 14 is cut diagonally, so that a beam of light exits downwardly rightward from the optical fiber 14, and then enters the ball lens 15. The ball lens 15 is a same-size optical system formed of a glass ball (BK7) of 0.25 mm in diameter. A beam of light which has passed through the ball lens 15 is deflected by way of total reflection on the silicon micro prism 17 integrated with the silicon bench 13. The silicon micro prism 17 has an apical angle of approximately 70°, and is formed by anisotropic etching. The beam of light deflected by the silicon micro prism 17 is condensed on the optical waveguide inside the optically assisted section 12A immediately therebelow, whereby its coupling with the optical waveguide is completed. The optical fiber 14 has a mode field diameter of approximately 9 μm, and the optical waveguide inside the optically assisted section 12A also has a mode field diameter of approximately 9 µm, so that the magnification of this optical system is 1:1. When the beam of light exiting from the optically assisted section 12A is irradiated as a micro light spot to the disk 2 (FIG. 1), the temperature of the irradiated portion of the disk 2 temporarily increases, thereby decreasing the coercive force of the disk 2. Then, to this irradiated portion where the coercive force has decreased, the magnetic recording section 12B writes magnetic information.

The optical configuration of the second embodiment (FIG. 3) will be described. The silicon bench 13 is provided with a V-groove, not shown, formed by anisotropic etching, and the optical fiber 14 of 125 µm in diameter is set in the V-groove. The light exit side end surface of the optical fiber 14 is cut diagonally, so that a beam of light exits downwardly rightward from the optical fiber 14, and then enters the ball lens 15. The ball lens 15 is a same-size optical system formed of sapphire of 0.15 mm in diameter. A beam of light which has passed through the ball lens 15 is deflected by way of total reflection on the silicon micro prism 17 integrated with the silicon bench 13. The silicon micro prism 17 has an apical angle of approximately 70°, and is formed by anisotropic etching. The beam of light deflected by the silicon micro prism 17 is condensed on the optical waveguide inside the optically assisted section 12A immediately therebelow, whereby its coupling with the optical waveguide is completed. The optical fiber 14 has a mode field diameter of approximately 9 µm, and the optical waveguide inside the optically assisted section 12A also has a mode field diameter of approximately 9 µm, so that the magnification of this optical system is 1:1. When the beam of light exiting from the optically assisted section 12A is irradiated as a micro light spot to the disk 2 (FIG. 1), the temperature of the irradiated portion of the disk 2 temporarily increases, thereby decreasing the coercive force of the disk 2. Then, to this irradiated portion where the coercive force has decreased, the magnetic recording section 12B writes magnetic information.

The optical configuration of the third embodiment (FIG. 4) will be described. The silicon bench 13 is provided with a V-groove, not shown, formed by anisotropic etching, and the optical fiber 14 of 125 µm in diameter is set in the V-groove. The light exit side end surface of the optical fiber 14 is cut diagonally, so that a beam of light exits upwardly rightward from the optical fiber 14, and then enters the ball lens 15. The ball lens 15 is formed of a glass ball (BK7) of 0.15 mm in diameter, and a beam of light is substantially collimated by the ball lens 15. A beam of light which has passed through the ball lens 15 enters the hemisphere lens 16. The hemisphere lens 16 is formed of a glass hemisphere (BK7) of 0.093285 mm in diameter and bonded to the silicon micro prism 17 integrated with the silicon bench 13. The substantially collimated beam of light exiting from the ball lens 15 is condensed on the hemisphere lens 16, and then deflected by total reflection on the silicon micro prism 17. The silicon micro prism 17 has an apical angle of approximately 70°, and is formed by anisotropic etching. The beam of light deflected by the silicon micro prism 17 is condensed on the optical waveguide inside the optically assisted section 12A immediately therebelow, whereby its coupling with the optical waveguide is completed. The optical fiber 14 has a mode field diameter of approximately 9 µm, and the optical waveguide inside the optically assisted section 12A also has a mode field diameter of approximately 9 µm, so that the magnification of this optical system is 1:1. When the beam of light exiting from the optically assisted section 12A is irradiated as a micro light spot to the disk 2 (FIG. 1), the temperature of the irradiated portion of the disk 2 temporarily increases, thereby decreasing the coercive force of the disk 2. Then, to this irradiated portion where the coercive force has decreased, the magnetic recording section 12B writes magnetic information.

The optical configuration of the fourth embodiment (FIG. 5) will be described. The silicon bench 13 is provided with a V-groove, not shown, formed by anisotropic etching, and the optical fiber 14 of 125 µm in diameter is set in the V-groove. The light exit side end surface of the optical fiber 14 is cut diagonally, so that a beam of light exits downwardly rightward from the optical fiber 14, and then enters the ball lens 15. The ball lens 15 is a same-size optical system formed of a glass ball (BK7) of 0.3 mm in diameter. The beam of light which has passed through the ball lens 15 is deflected by way of reflection on the silicon micro mirror 18 integrated with the silicon bench 13. The silicon micro mirror 18 forms an angle of approximately 54 degrees with respect to the slider 11 and is formed by anisotropic etching. The surface of the silicon micro mirror 18 is coated with aluminum. The beam of light deflected by the silicon micro mirror 18 is condensed on the optical waveguide inside the optically assisted section 12A immediately therebelow, whereby its coupling with the optical waveguide is completed. The optical fiber 14 has a mode field diameter of approximately 9 µm, and the optical waveguide inside the optically assisted section 12A also has a mode field diameter of approximately 9 µm, so that the magnification of this optical system is 1:1. When the beam of light exiting from the optically assisted section 12A is irradiated as a micro light spot to the disk 2 (FIG. 1), the temperature of the irradiated portion of the disk 2 temporarily increases, thereby decreasing the coercive force of the disk 2. Then, to this irradiated portion where the coercive force has decreased, the magnetic recording section 12B writes magnetic information.

Figure 6:
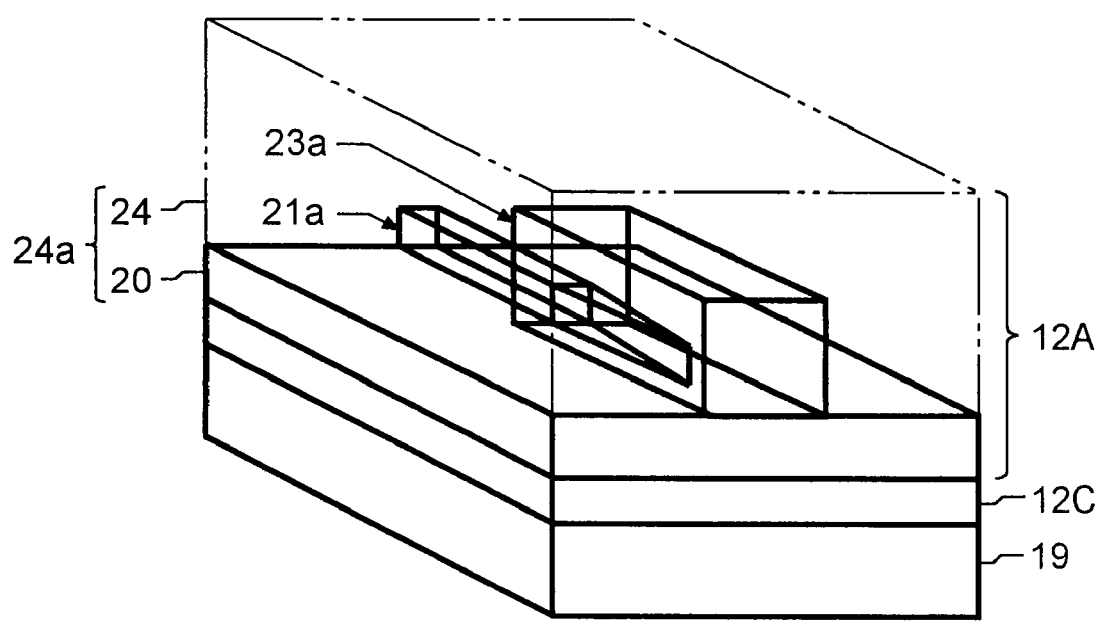
FIG. 6 is a perspective view showing a first example of an optically assisted section according to the invention.
Figure 7A:
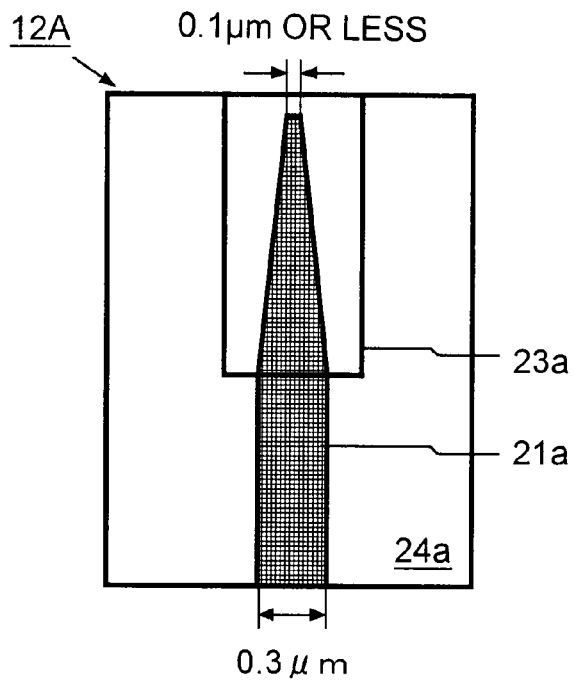
FIGS. 7A and 7B are cross sections when the first example of the optically assisted section is viewed from the flow end side.
Figure 7B:
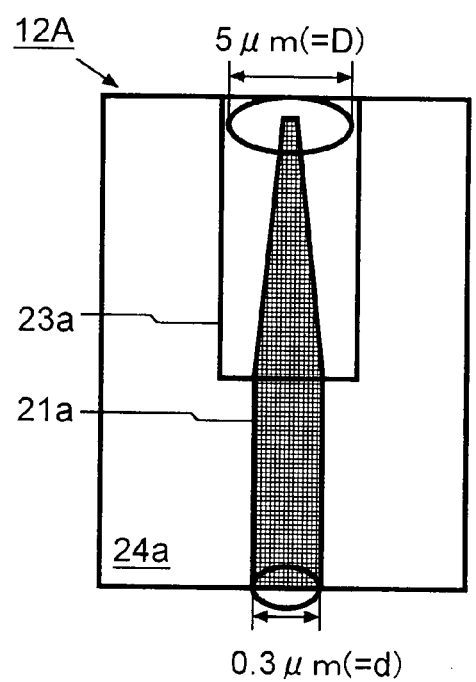
Figure 8:
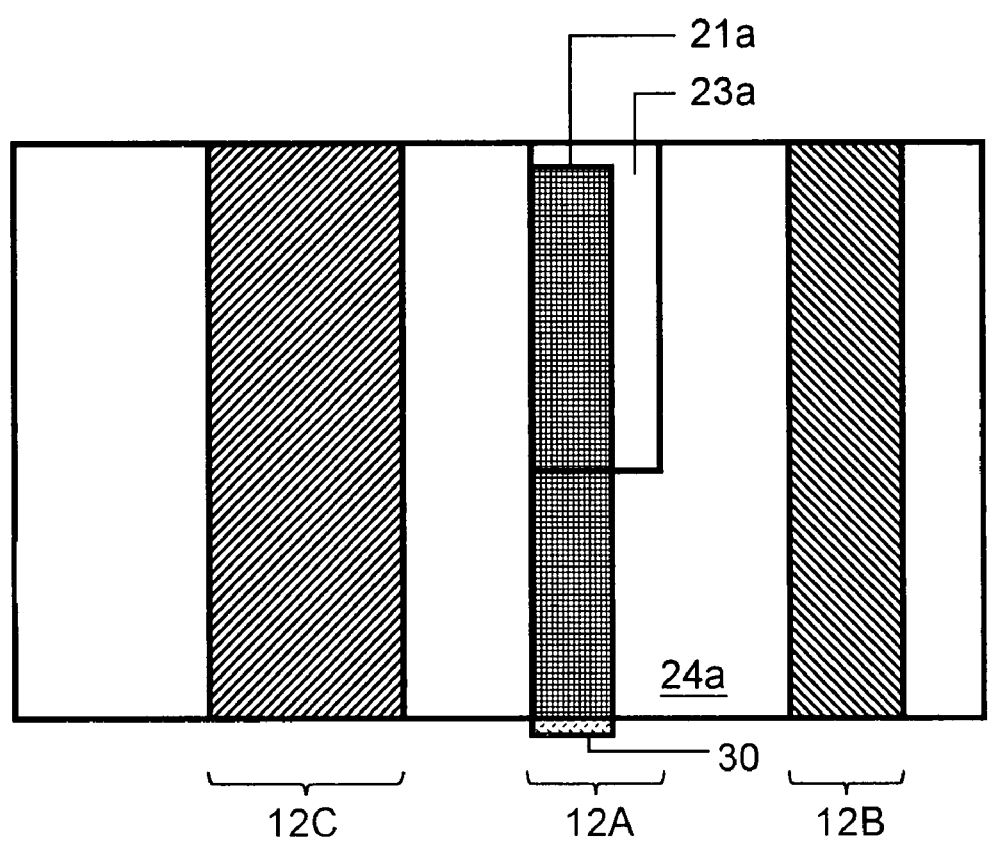
FIG. 8 is a cross section when the first example of the optically assisted section is viewed from the side.
Figure 9:
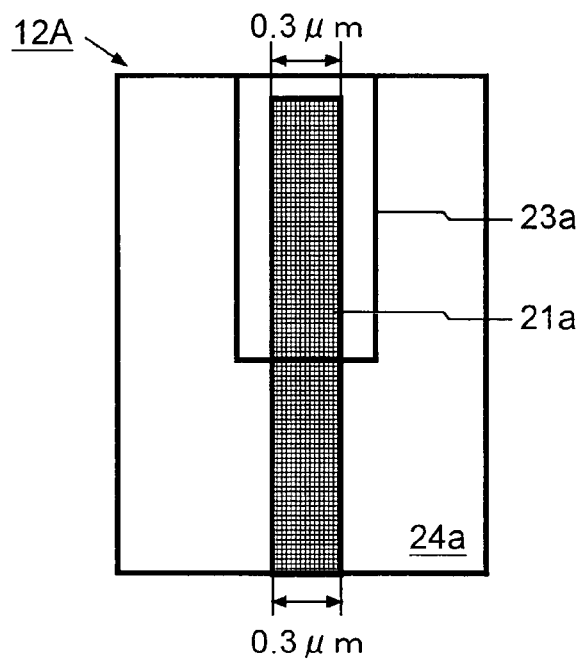
FIG. 9 is a cross section when a second example of the optically assisted section is viewed from the flow end side.
Figure 10:
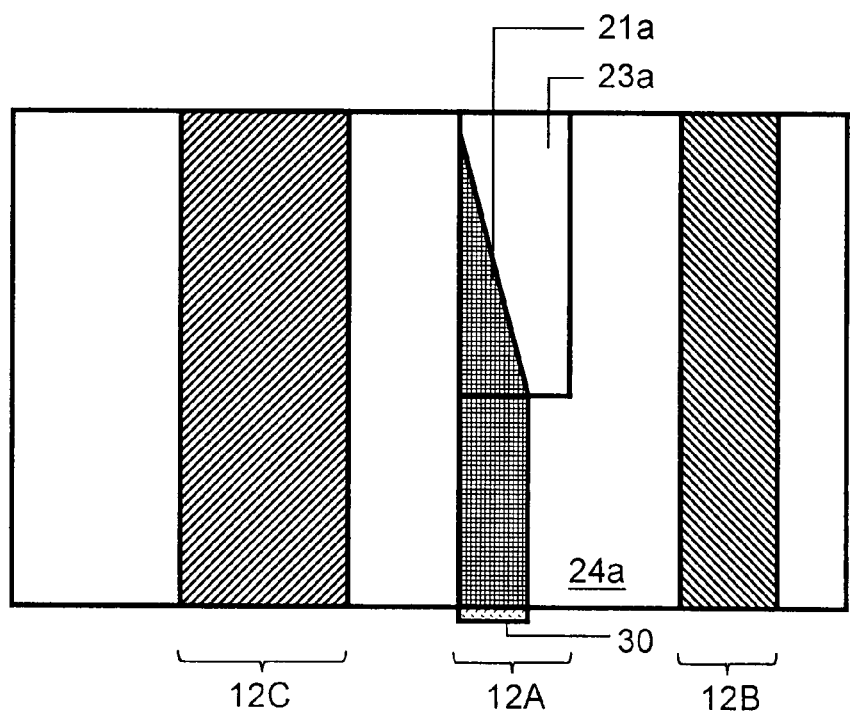
FIG. 10 is a cross section when the second example of the optically assisted section is viewed from the side.
Figure 11:
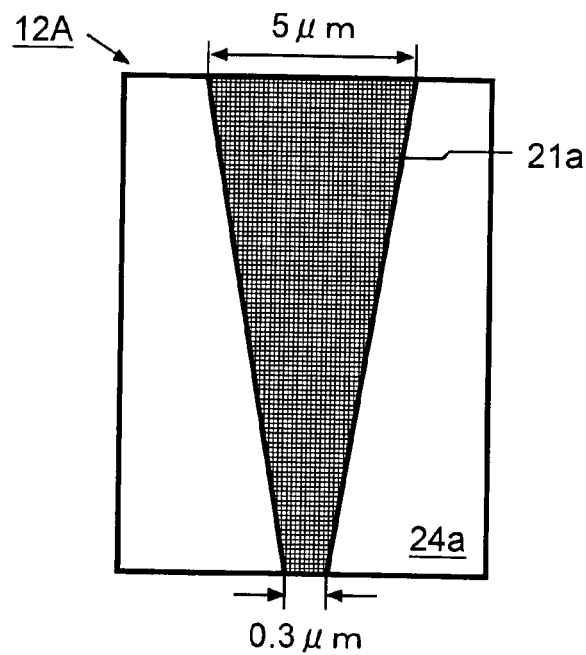
FIG. 11 is a cross section when a third example of the optically assisted section is viewed from the flow end side.
Figure 12:
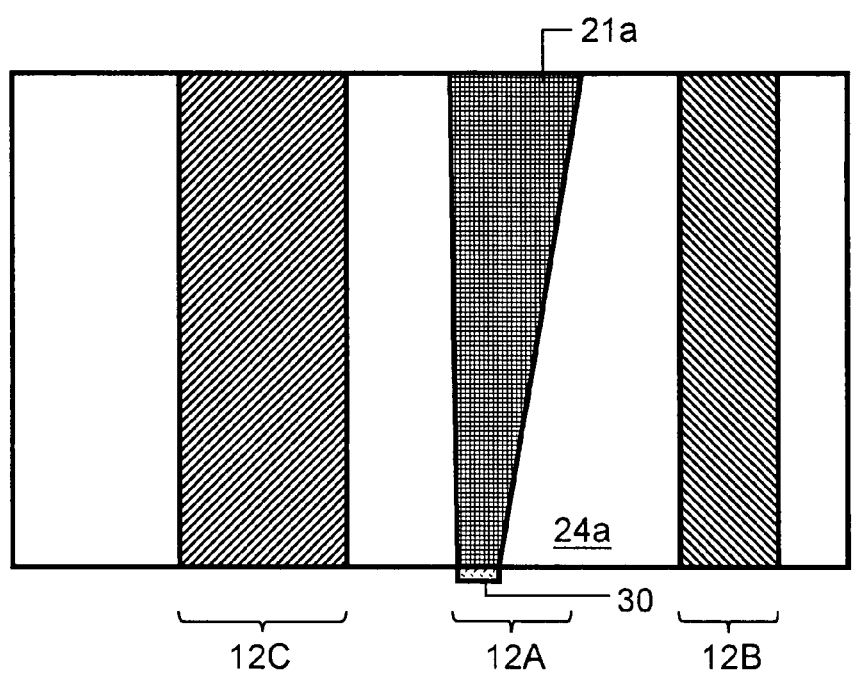
FIG. 12 is a cross section when the third example of the optically assisted section is viewed from the side.

Next, the optically assisted section 12A included in the slider 11 of the magnetic recording head 3 of the first to fourth embodiments (FIGS. 2 to 5) will be described, referring to the first to third examples thereof. FIGS. 6 to 8 show the first example of the optically assisted section 12A, FIGS. 9 and 10 show the second example thereof, and FIGS. 11 and 12 show the third example thereof. FIG. 6 shows a perspective view of the first example, FIGS. 7A, 7B, 9, and 11 show cross sections of the first to third examples, respectively, as viewed from the outflow end side (that is, the outflow side of the recording region of the disk 2 (FIG. 1)). FIGS. 8, 10, and 12 show cross sections of the first to third examples, respectively, as viewed from the side (corresponding to cross sections of FIGS. 2 to 5).

The optically assisted section 12A of the first and second examples has an optical waveguide composed of a core 21a (for example, Si), a sub core 23a (for example, SiON), and a cladding 24a (for example, SiO$_2$). The optically assisted section 12A of the third example has an optical waveguide composed of a core 21a and a cladding 24a. Arranged at or near light exit position of the optical waveguide, as shown in FIGS. 8, 10, and 12, is a plasmon probe 30 for near-field light generation, concrete examples of which are shown in FIGS. 13A to 13C.

Figure 13A:
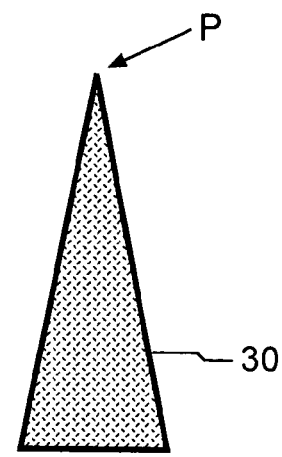
FIGS. 13A, 13B, and 13C are plan views showing concrete examples of a plasmon probe.
Figure 13B:
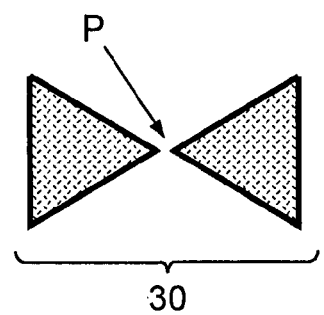
Figure 13C:
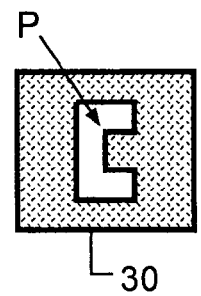

FIG. 13A shows the plasmon probe 30 formed of a triangular plate-like metal thin film (examples of its material includes aluminum, gold, silver, and the like), and FIG. 13B shows the plasmon probe 30 formed of a bow-tie plate-like metal thin film (examples of its material includes aluminum, gold, silver, and the like), both of which are formed of an antenna having a vertex P with a radius of curvature of 20 nm or less. FIG. 13C shows the plasmon probe 30 which is formed of a plate-like metal thin film (examples of its material includes aluminum, gold, silver, or the like) having an opening and which is formed of an aperture having a vertex P of 20 nm or less in a radius of curvature. When light acts on these plasmon probes 30, near-field light is generated near the vertex P thereof, thereby permitting recording or reproduction using light of a very small spot size. More specifically, generating localized plasmon by providing the plasmon probe at or near the light exit position of the optical waveguide permits further reducing the size of a light spot formed in the optical waveguide, which is advantageous for high-density recording. Moreover, as the material of the core, use of silicon, which has a high refractive index, provides favorable efficiency in generating optical near-field. It is preferable that the vertex P of the plasmon probe 30 be located at the center of the core 21$a$, and also it is preferable that gold be used as a material of a metal thin film for a near-infrared wavelength (1550 nm).

The spot diameter required for performing super-high-density recording in an optically assisted method is approximately 20 nm. Considering the light utilization efficiency, the mode field diameter (MFD) in the plasmon probe 30 is preferably approximately 0.3 μm. Since it is difficult for light to enter therein without changing the size, it is required to perform size conversion to reduce the spot diameter from approximately 5 μm to several hundreds of nanometers. In the first to third examples of the optically assisted section 12A, forming a spot size converter with at least part of the optical waveguide permits spot size conversion to facilitate light incidence.

The width of the core 21$a$ in the first example is fixed from the light input side to the light output side in the cross section of FIG. 8. However, in the cross section shown in FIG. 7A, the width of the core 21$a$ inside the sub core 23$a$ changes in such a manner as to gradually widen from the light input side to the light output side. The mode field diameter is converted by gradual change in the diameter of this optical waveguide. That is, the width of the core 21$a$ of the optical waveguide in the first example, as shown FIG. 7A, is 0.1 μm or less for the light input side and 0.3 μm for the light output side. However, as shown in FIG. 7B, on the light input side, the sub core 23$a$ forms an optical waveguide of approximately 5 μm in MFD, and thereafter light is gradually coupled together with the core 21$a$ whereby the mode field diameter decreases. In the second example, unlike the first example, the film thickness of the core 21$a$ in the cross section of shown in FIG. 10 becomes larger toward the light output side (plasmon probe 3 side), and in the cross section of FIG. 9, the mode field diameter is adjusted without changing the film thickness. In this manner, it is preferable that, where the mode field diameter of the optical waveguide on the light output side is d and the mode field diameter of the optical waveguide on the light input side is D (see FIG. 7B), the mode field diameter is converted by smoothly changing the diameter of the optical waveguide to thereby satisfy D>d.

If the leading end of the optical waveguide is so formed as to become narrower (or thinner) gradually, when light transmitted through the core of the optical waveguide reaches the core portion of a spot size conversion optical waveguide, the amount of light leaking into the cladding increases whereby light electric field distribution widens, thus resulting in a larger spot size. However, extremely too small width or thickness of the core of the conversion optical waveguide results in condition in which the transmission mode cannot exist as an optical waveguide, that is, cut-off condition. In this condition, the light is coupled together with the optical waveguide composed of the sub core (SiON) and the cladding ($SiO_2$), thus permitting formation of a large light spot. The description has been given referring to the direction in which the small spot widens, and if light in the same form as that of the light spot widened by light reversing property as described above is made incident, the light spot can be reduced. Even with only one thinning direction, the light spot can be increased two-dimensionally.

The width of the core 21$a$ in the third example, as shown in FIGS. 11 and 12, changes in such a manner as to become gradually thinner from the light input side to the light output side in the cross section in both directions. More specifically, the width of the core 21$a$ of the optical waveguide in the third example, as shown in FIG. 11, is 5 μm for the light input side and 0.3 μm for the light output side. By the gradual change in the diameter of this optical waveguide, the mode field diameter is converted. In this manner, making the core of the optical waveguide gradually wider (or thicker) increases the light spot depending on this shape. If light in the same form as that of the light spot widened by light reversing property as described above is made incident, the light spot can be reduced.

As described above, to form a light spot on the disk by a typical lens or SIL, large NA needs to be provided to provide a small spot size. This means that the angle of a ray of light traveling toward the condensing point is large, which causes the light to interfere with the magnetic recording section or the magnetic reproduction section and also leads to the upsizing of the beam diameter or the magnetic recording head. On the contrary, in the magnetic recording head 3 described above, the slider 11 has the optical waveguide, so that no problem of interference with the magnetic recording section or the magnetic reproduction section arises in its arrangement. Moreover, increasing the mode field diameter at the top of the slider 11 by the spot size converter formed with at least part of the optical waveguide permits providing a small NA of the upper lens and permits providing a small beam diameter, thus contributing to downsizing of the optical system.

Typically, the length of the optical waveguide section agrees with the slider thickness, but may be around this value with some special configuration. For example, if the slider is formed into a concave shape (or convex shape) for position adjustment and if, on the contrary, the silicon bench is formed into a convex shape (or concave shape), the length of the optical waveguide section does not have to agree with the slider thickness. Moreover, it is preferable that the length of the spot size converter be 0.2 mm or more, because rapid spot size conversion causes light leakage which requires a length of 0.2 mm or more to reduce this excess loss. The length of the spot size converter in the first to third examples corresponds to the length of a portion where the width of the core 21$a$ gradually changes from the light input side to the light output side, and thus corresponds to the length of the sub core 23$a$ in the first and second examples.

Figure 14A:
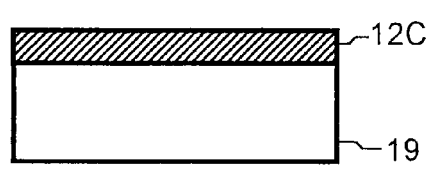
FIGS. 14A, 14B, 14C, 14D, 14E, 14F, 14G, and 14H are cross sections showing fabrication processes of a slider having the optically assisted section in the first example.
Figure 14B:
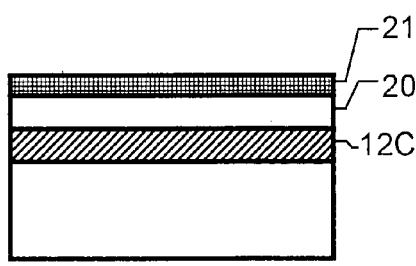
Figure 14C:
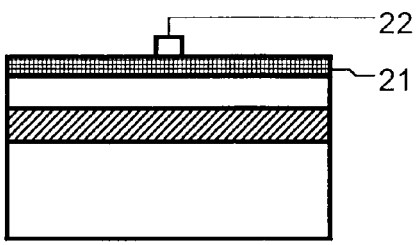
Figure 14D:
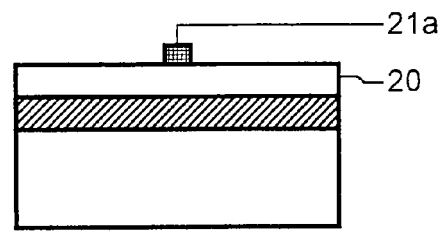
Figure 14E:
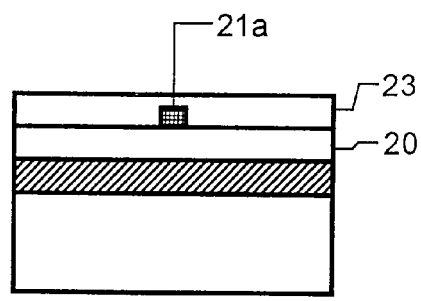
Figure 14F:
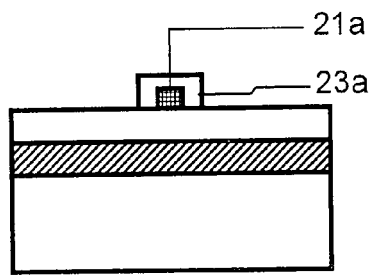
Figure 14G:
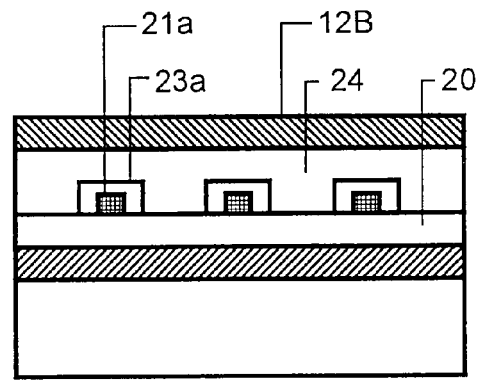
Figure 14H:
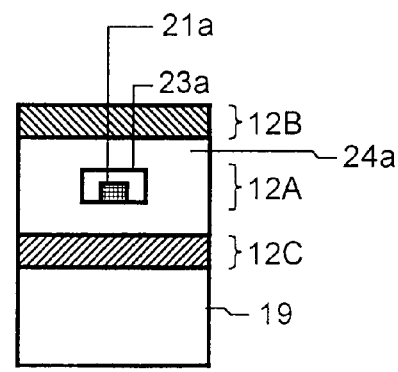

Next, a method of fabricating the slider 11 having the optically assisted section 12A of the first example will be described, with reference to a process diagram of FIG. 14. As shown in 14A, the magnetic reproduction section 12C is fabricated on a substrate 19 (its material is AlTiC or the like) and then flattened. As shown in FIG. 14B, an $SiO_2$ layer 20 is formed into a thickness of 3 μm by using CVD (Chemical Vapor Deposition), and subsequently an Si layer 21 is formed into a thickness of 300 nm. Then, a resist is applied thereon, and as shown in FIG. 14C, the core shape is patterned by way of electron-beam lithography (or lithography using stepper) to form a resist pattern 22, upon which the resist pattern is formed so that the core is formed into a desired tapered shape. The Si layer 21 is processed by using RIE (Reactive Ion Etching) to form a core 21$a$ as shown in FIG. 14D. As shown in FIG. 14E, an SiON layer 23 in a thickness of 3 μm is laid by using CVD. The SiON layer 23 is processed into a width of 3 μm by photolithography process to form a sub core 23$a$ as shown in FIG. 14F. As shown in FIG. 14G, a SiO$_2$ layer 24 is formed into a thickness of 5 μm by using the CVD and then flattened to fabricate the magnetic recording section 12B. As shown in FIG. 14H, the slider shape is cut by a processing method such as dicing, milling, or the like. The cladding 24a is formed of the SiO$_2$ layer 20 and a SiO$_2$ layer 24. The substrate 19 is formed of AlTiC, but may be formed of silicon.

Figure 15A:
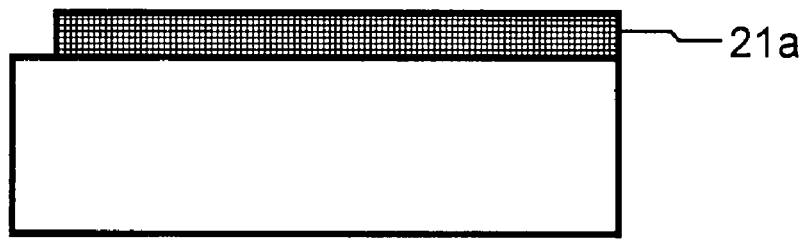
FIGS. 15A, 15B, and 15C are cross sections showing formation processes of a core of the optically assisted section in the second example.
Figure 15B:
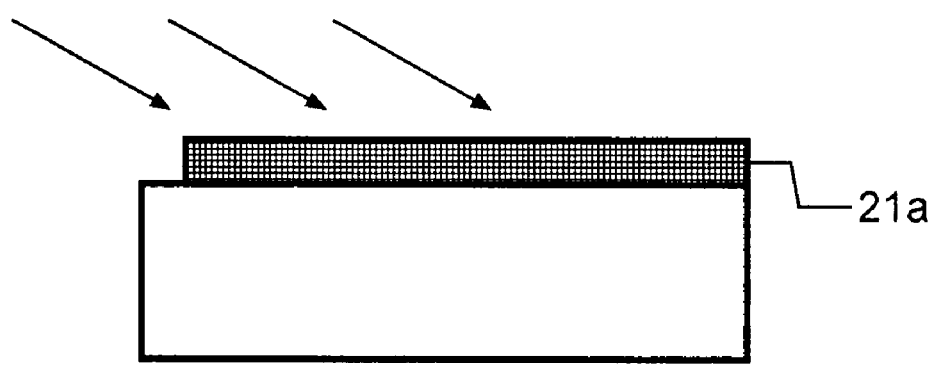
Figure 15C:
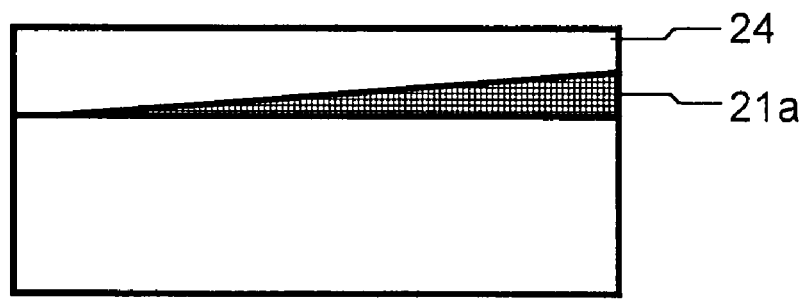

To fabricate the slider 11 having the optically assisted section 12A of the second example, a core 21a is formed in FIG. 14D (FIG. 15A), then, as shown in FIG. 15B, diagonal etching is performed by a dry etching system to thereby form a tapered shape, a sub core 23a is formed in FIG. 14F, and then as shown in FIG. 15C, an SiO$_2$ layer 24 is formed to form a cladding 24a (the sub core 23a is omitted in FIG. 15C). To fabricate the slider 11 having the optically assisted section 12A of the third example, diagonal etching is performed in a direction opposite to the direction in which the diagonal etching has been performed in the second example.

As described above, it is preferable that the material of the core of the optical waveguide be silicon and that the working wavelength of the optical waveguide be a near-infrared wavelength. Various materials with high refractive index are known, and use of such a material with high refractive index can support various wavelengths from ultraviolet light to visible light and near-infrared light, which permits wide choices for a member forming a laser or an optical system. However, typically, for a material with high refractive index, the etching speed is slow even when processed by a dry etching device, and also it is hard to provide a selection ratio with respect to the resist, thus resulting in difficulty in forming a micro structure with favorable performance. For example, for materials such as GaAs, GaN, and the like, visible light can be used but processing is difficult. Silicon is a typical material for semiconductor processes and its processing method has been already established; thus, it is relatively easily processed. Therefore, it is preferable that silicon be used as a material for the core of the optical waveguide. However, the use of silicon as a material for the core of the optical waveguide disables the use of visible light. Thus, it is preferable that near-infrared light be used as light used for the optical waveguide. That is, use of a light source of a near-infrared wavelength (1550 nm, 1310 nm, or the like) permits use of silicon, which has been used before, as a material for the core, thus advantageously improving the workability.

Silicon is much higher in refractive index than quartz; therefore, the use of silicon as a material for the core of the optical waveguide permits a large refractive index difference Δn between the core and the cladding, so that a micro spot (that is, high energy density) can be provided with simple structure. For example, as described above, forming the core with silicon and the cladding with SiO$_2$ permits a large refractive index difference Δn and also permits the spot diameter as small as 1 μm or less, i.e., approximately 0.5 μm. Note that the spot diameter provided with an optical waveguide with a core formed of quartz is approximately 10 μm.

Figure 16:
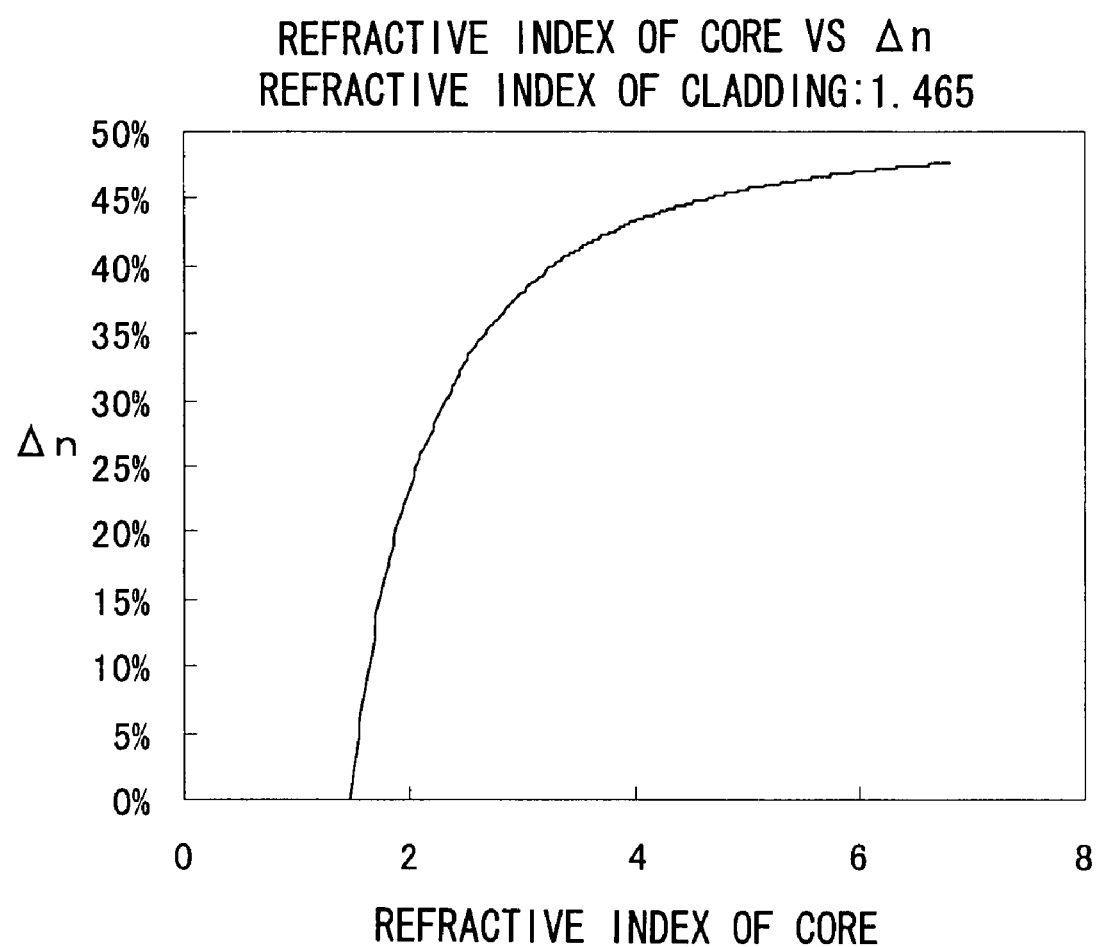
FIG. 16 is a graph showing the relationship between the refractive index of the core and Δn.

The refractive index difference Δn between the core and the cladding, where the refractive index (silicon or the like here) of the core is n1 and the refractive index of the cladding (SiO$_2$ or the like here) is n2, is defined by: $\Delta n(\%)=(n1^2-n2^2)/(2 \cdot n1^2) \times 100 \approx (n1-n2)/n1 \times 100$. FIG. 16 shows a graph of relationship between the refractive index of the core and the refractive index difference Δn (in a case of a cladding refractive index of 1.465). The refractive index of SiO$_2$ is 1.465, the refractive index of SiON is 1.5, and the refractive index of Si is 3.5.

It is preferable that the refractive index difference Δn between the core and the cladding in the optical waveguide be 20% or more. Use of an optical waveguide with a refractive index difference Δn as high as 20% or more permits providing a micro spot with simple configuration. The beam diameter of a basic mode is 1 μm or less, which requires a refractive index difference Δn of 20% or more. This 1 μm is a beam diameter required for energizing plasmon with high efficiency. The refractive index difference Δn is 50% or less, because Δn only approaches closely 50% with any high refractive index of the core.

Now, experimental results supporting that a refractive index difference Δn of 20% or more is preferable will be described. To determine a desirable value of refractive index difference, writing to a phase-change medium is performed and reviewed. A phase-change medium (GeSbTe) is used as a medium, and an LD (laser diode) light source (of a wavelength of 1.31 μm) with 10 mW is used as a light source. Silicon is used as a material for a waveguide, and the core diameter is changed to 5 μm, 4 μm, 3 μm, 2 μm, 1 μm, and 0.5 μm to fabricate an optical waveguide. At the leading end of the optical waveguide, a plasmon probe of gold is provided. At the experiment, the medium and the plasmon probe are brought to approach each other by using a piezo actuator with a clearance of 20 nm or less provided therebetween. Light is condensed by using an optical system to thereby enter the optical waveguide with diameters corresponding MFDs of respective waveguides to thereby transmit the basic mode. As a result, writing could be performed with a core diameter of 1 μm or less. With a core diameter of 0.5 μm, writing could be performed more favorably. Based on the above, it has been proved that the refractive index difference be preferably 20% or more and more preferably 40% or more.

As described above, silicon is an effective material for the core for a near-infrared wavelength, but when no processing merit is required, use of a different material with high refractive index as a material for the core permits providing effect of a micro spot with wide wavelengths ranging from ultraviolet light to visible light and near-infrared light. Examples of a material other than silicon with high refractive index (wavelength range) include: diamond (all visible range); III-V series semiconductor: AlGaAs (near-infrared, red), GaN (green, blue), GaAsP (red, orange, blue), GaP (red, yellow, and green), InGaN (blue green, blue), AlGaInP (orange, yellow-orange, yellow, green); and II-VI semiconductor: ZnSe (blue). Examples of processing methods for a material with high refractive index other than silicon include: dry etching with O$_2$ gas for diamond; and dry etching processing with an ICP etching device using Cl$_2$ gas or methane hydrogen for GaAs series, GaP series, ZnSe, and GaN series.

As described above, it is preferable to an optical waveguide whose core is formed of silicon or the like as a material with high refractive index, and this core with high refractive index permits providing a small light spot. However, if the optical waveguide is connected to the top of the slider without changing the small spot size (if a spot size converter is not used), an optical system with large NA needs to be used to make light enter the optical waveguide. Therefore, it is required to use, as an optical system, a lens with high accuracy, such as an aspherical lens or the like. Generally, hot forming is applied for fabricating a lens with high accuracy, such as an aspherical lens or the like, but hot forming accompanies a problem involved in fabricating a die, which requires the accuracy and like of a lens surface to be maintained during the forming process. Thus, the size of the lens needs to be relatively large size, with a current lower limit of approximately 1.5 mm in diameter.

As described above, for disk devices such as a hard disk device and the like, a plurality of recording disks are generally used in response to demands for a higher capacity. In this case, it is necessary that the magnetic recording head be thin to such a degree which permits it to enter and move in the clearance. Even when a plurality of disks are not used, a space between the housing wall and the disk is small for a small-size hard disk device or the like, and thus the magnetic recording head also needs to be thin. This space is approximately 1 mm. However, use of the optical waveguide as described above requires an optical system with high NA, which in turn requires the use of a lens with high accuracy, such as an aspherical lens or the like, that is, a lens in a relatively large size, which results in failure to satisfy this demand. The required accuracy in the arrangement of the slider and the optical system depends on the light spot size of the optical waveguide on the light input side; thus, from this viewpoint, it is necessary that the light spot on the light input side be larger than the light spot on the light output side (recording section side).

In the magnetic recording head 3 described above, the spot size converter is used to provide a larger light spot on the light input side than a light spot on the light output side. This permits use of an optical system with small NA, which permits use of a lens (for example, a ball lens, a diffraction lens, or the like) whose configuration is simple and which can be easily downsized, which in turn permits, for the first time, thinning the optical system. The arrangement accuracy required for the slider and the optical system is not strict, which is advantageous for assembly.

Based on the above requirement, it is preferable that where the mode field diameter of the optical waveguide on the light output side is d and the mode field diameter thereof on the light input side is D, the mode field diameter is converted by gradually changing the diameter of the optical waveguide to satisfy D>d. For example, for the first example described above, D is equal to 5 μm and d is equal to 0.3 μm (FIG. 7B). With the configuration such that converting the mode field diameter by gradually changing the diameter of the optical waveguide to provide smaller light output side mode field diameter of the optical waveguide than light input side mode field diameter of the optical waveguide permits providing a small light spot. Providing a small light spot size permits higher recording density. For the upper limit of magnification, considering principles problems at fabrication (upper limit of the largest light spot size and lower limit of the smallest light spot size) and actual values required for magnification (light output side size: 0.25 μm and light input side size: 10 μm), approximately 40× can be defined. Therefore, it is further preferable that the mode field diameter satisfy 40d>D>d.

It is preferable that the maximum height of the magnetic recording head combining together the optical system and the slider be smaller than space between the disk and the member (for example, case for housing the disk and the slider, the second recording disk). The magnetic recorder 10 shown in FIG. 1 has an optical waveguide for writing information into the disk 2 and is configured so that the maximum height of the magnetic recording head 3 combining together the slider 11 (FIG. 2 and the like) which moves relative to the disk 2 while floating thereon and the optical system which makes light enter the optical waveguide is smaller than distance between the case 1 and the disk 2 so disposed as to cover the moving path of the slider 11 and also smaller than distance between the disks 2 adjacently located. This configuration achieves downsizing of the magnetic recorder 10.

Figure 17:
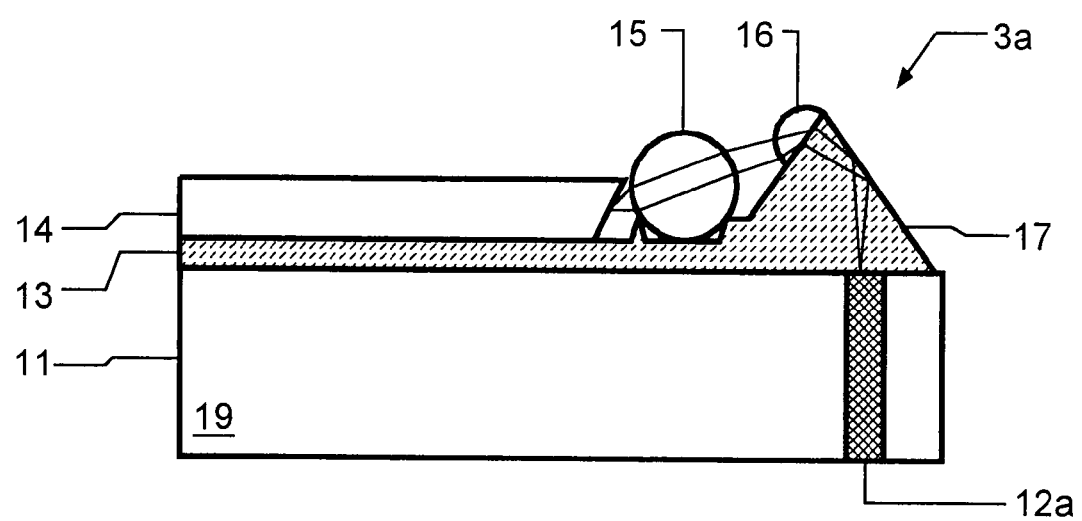
FIG. 17 is a cross section showing one embodiment of a micro-optical recording head other than an optically assisted magnetic recording head.

The magnetic recording head 3 described above is an optically assisted magnetic recording head which uses light for information recording into the disk 2, but is not limited to the optically assisted magnetic recording head if it is a micro-optical recording head which uses light for information recording into a recording medium and also which has a slider that moves relative to the recording medium while floating thereon and that has an optical waveguide with a refractive index difference of 20% or more between the core and the cladding. For example, for a recording head which performs recording such as near-field light recording, phase change recording, and the like, the use of an optical waveguide with the features described above can provide the same effect. FIG. 17 shows a micro-optical recording head 3a having such an optical waveguide 12a. This micro-optical recording head 3a performs optical recording without use of magnetism and is configured in the same manner as the magnetic recording head 3 of the third embodiment (FIG. 4) except for that the former does not have the magnetic reproduction section 12C and the magnetic recording section 12B. Note that the plasmon probe 30 described above may be arranged at or near the light exit position of the optical waveguide 12a.

Figure 22:
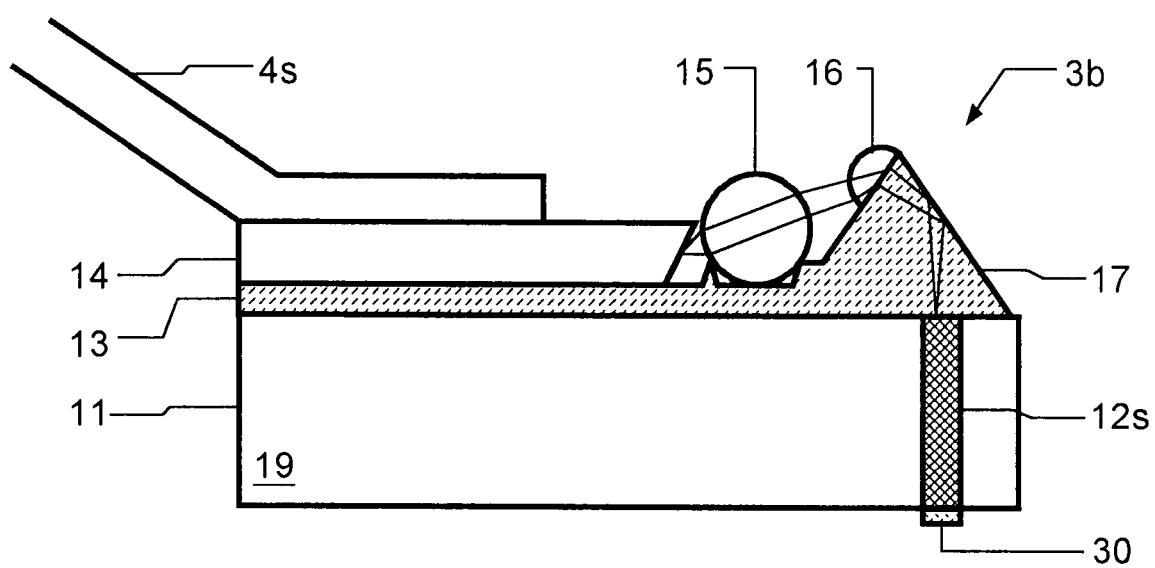
FIG. 22 is a cross section showing one embodiment of a micro-optical recording head other than an optically assisted magnetic recording head.

FIG. 22 shows a micro-optical recording head 3b as another embodiment using the configuration of the invention. Light transmitted through the optical fiber 14 is condensed on the lenses 15 and 16, and the like and also reflected on the reflection surface 17 to enter a silicon optical waveguide 12s (spot size conversion configuration is not shown). The silicon optical waveguide 12s fixed on the slider 11 (although not shown, ceramic such as AlTiC, zirconia, or the like is usually used except for the light passage path of the slider 11). The bottom surface of the slider 11 is processed into an ABS (Air Bearing Surface) which controls the amount of floating on the recording disk surface of the slider 11 by air flow. The slider 11 is fixed on the suspension 4s and pressed against the recording disk surface by the suspension 4s. In this case, the plasmon probe 30 generates a micro light spot used for recording (or reproducing) is fabricated on the bottom surface of the optical waveguide (surface close to the medium). The medium is arranged under the slider 11, although not shown. Rotation of the medium at high speed permits the slider 11 to become stable and float at an interval of approximately 20 nm, and then making light incident thereon permits recording (or reproducing) on a micro spot.

Figure 18:
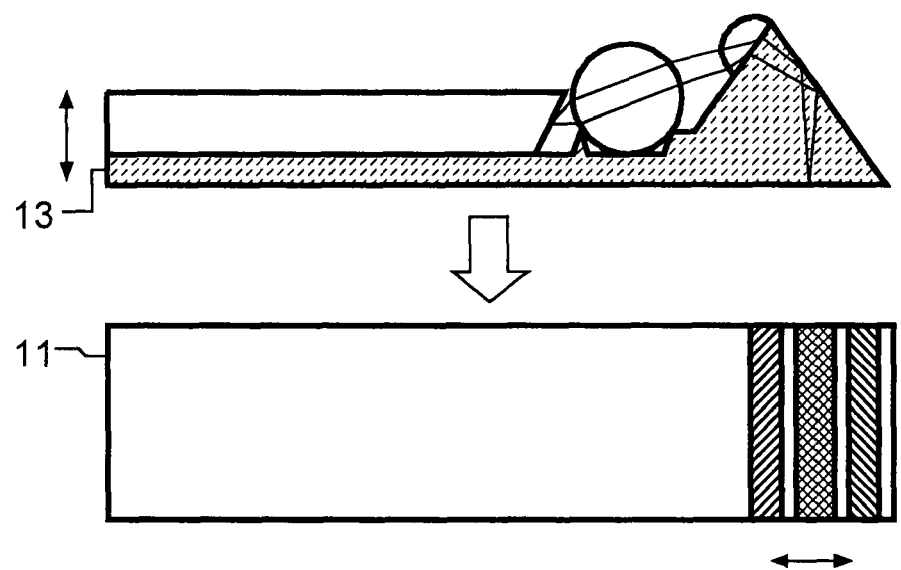
FIG. 18 is a cross section for explaining the assembly of a silicon bench and a slider.

Next, referring to the magnetic recording head 3 of the third embodiment (FIG. 4) as an example, position adjustment, adhesion, and the like between the silicon bench 13 and the slider 11 will be described. The light source section (optical fiber 14 and the like) and the optical system (ball lens 15 and the like) are fitted to the silicon bench 13 based on the mechanical accuracy. On the other hand, the optically assisted section 12A, the magnetic recording section 12B, and the magnetic reproduction section 12C are formed in the slider 11 through fabrication by way of processes shown in FIG. 14 and obtained by providing a floating structure (not shown) and the plasmon probe 30. That is, directions in which the silicon bench 13 and the slider 11 are fabricated are different as shown in arrows of FIG. 18. Therefore, it is preferable that they are separately assembled, which is effective in improving the individual fabrication accuracy and shortening the fabrication time.

Figure 19:
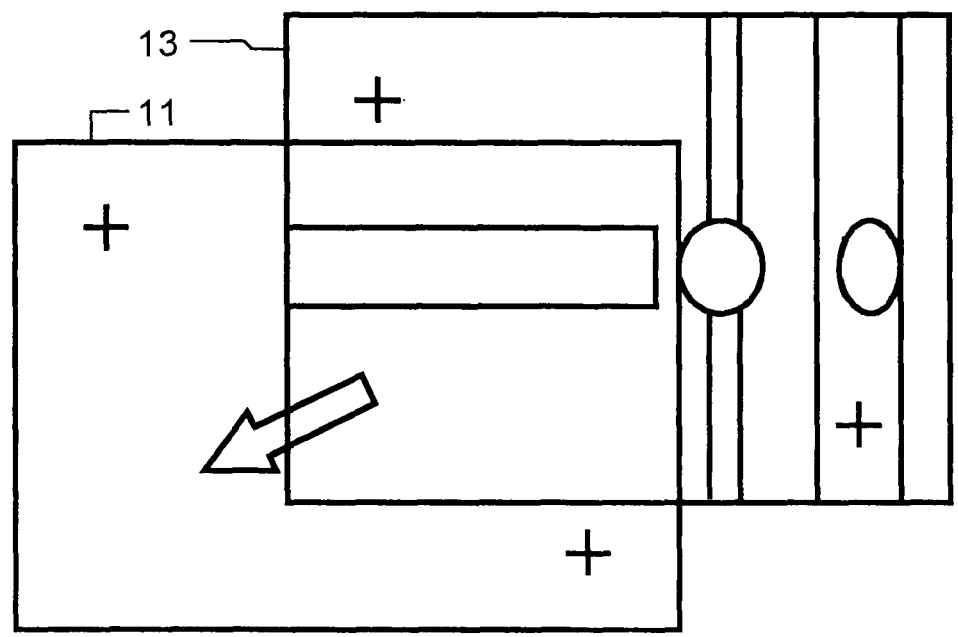
FIG. 19 is a plan view for explaining the horizontal position adjustment of the silicon bench and the slider.

Positioning of the silicon bench 13 and the slider 11 in the horizontal direction can be achieved with reference to a positioning mark (+) or the like as shown in FIG. 19 while observing the top sections of the silicon bench 13 and the slider 11 with a camera or the like. The observation with the camera can be achieved with infrared light. Since silicon is transparent for infrared light, the use of infrared light permits positioning with reference to the mark (+). With two positioning marks (+), the two directions (X-axis, Y-axis) mutually orthogonal to the optical axis (Z-axis) and an angle θZ about the optical axis can be adjusted. Since structures such as the optical fiber 14 and the like are placed on the top of the silicon bench 13, it is preferable that the positioning mark (+) be provided on the rear surface of the silicon bench 13.

Figure 20A:
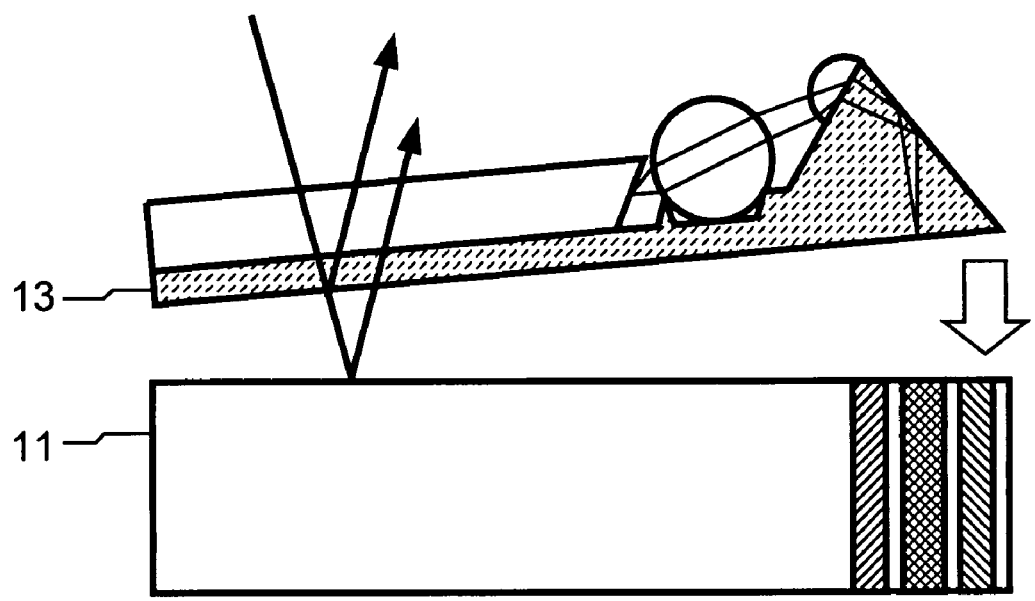
FIGS. 20A and 20B are diagrams for explaining slope adjustment 1 of the silicon bench and the slider.
Figure 20B:
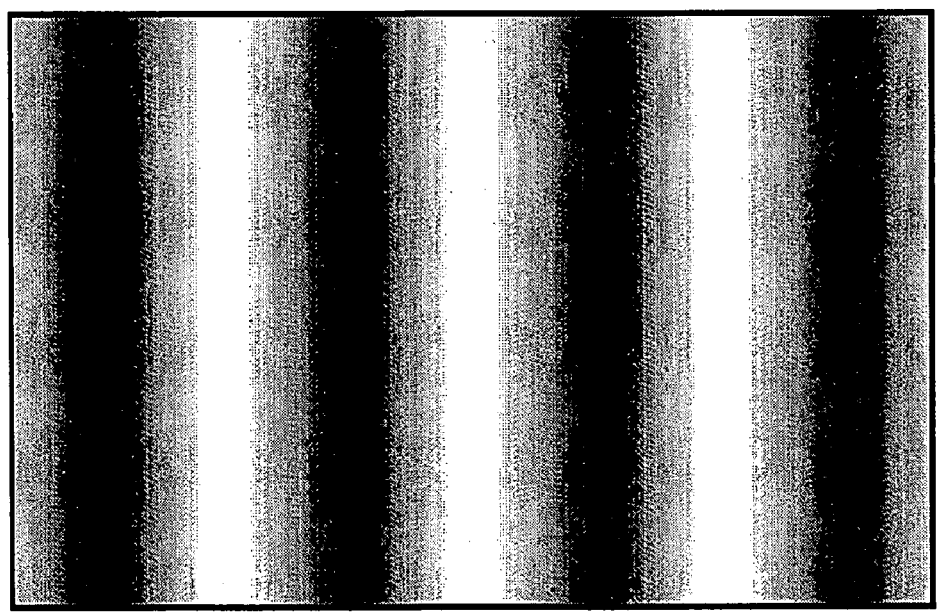
Figure 21A:
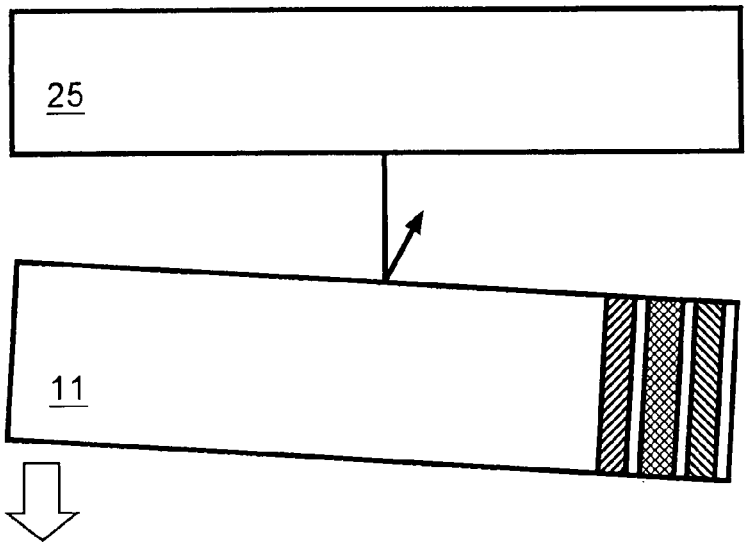
FIGS. 21A, 21B, 21C, and 21D are diagrams for explaining slope adjustment 2 of the silicon bench and the slider.
Figure 21B:
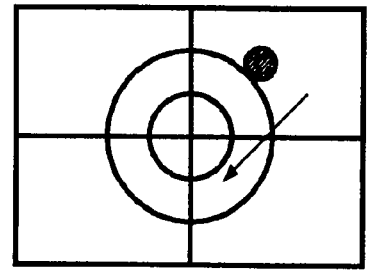
Figure 21C:
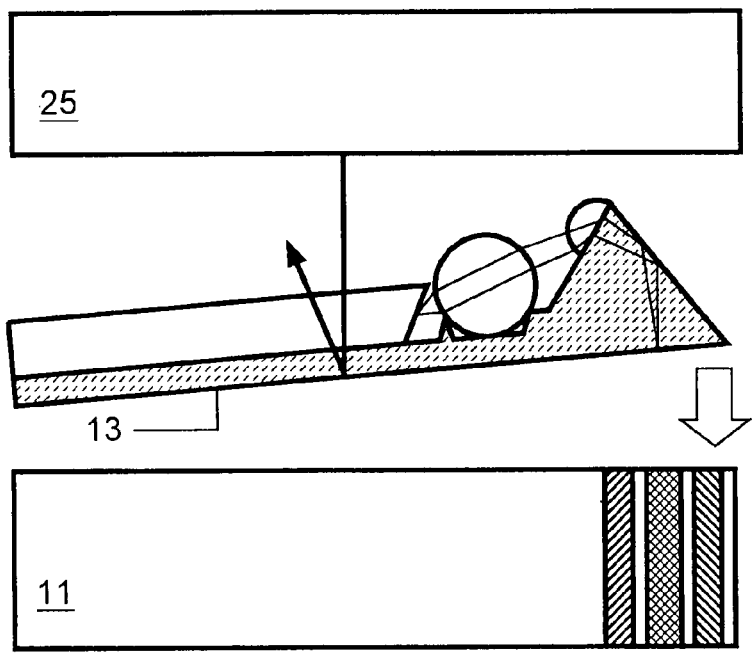
Figure 21D:
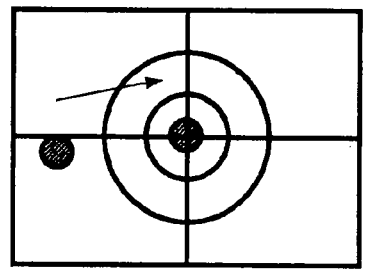

The slope adjustment of the silicon bench 13 and the slider 11 can be achieved by utilizing mutual interference using infrared light (slope adjustment 1). For example, infrared light is irradiated from above the silicon bench 13 as shown by an arrow of a solid line in FIG. 20A, and the slope can be adjusted by viewing an interference fringes (FIG. 20B) obtained by interference between light reflected on the bottom surface of the silicon bench 13 and light reflected on the top surface of the slider 11 to adjust the slope. The slope adjustment can also be performed with an autocollimator using infrared light (slope adjustment 2). FIG. 21A shows how the adjustment is made while measuring the slope of the slider 11 with the autocollimator 25, and FIG. 21B shows an image provided by the autocollimation in this condition. FIG. 21C shows how the adjustment is made while measuring the slope of the silicon bench 13 with the autocollimator 25, and FIG. 21D shows an image provided by the autocollimation in this condition.

It is preferable that the silicon bench 13 and the slider 11 are bonded together with an adhesive. Examples of the adhesive include: a heat-hardening adhesive (liquid type, sheet type), a twp-part adhesive (liquid type, and an anaerobic adhesive (liquid type). Examples of the heat-hardening adhesive (liquid type, sheet type) include: (transparent) acrylic resin which transmits the working wavelength, epoxy resin, silicone resin, and thermosetting polyimide. Examples of the two-part adhesive (liquid type) include: (transparent) acrylic resin which transmits the working wavelength, epoxy resin, and urethane resin. Examples of the anaerobic adhesive (liquid type) include: those which are not cured while in contact with air but cured when separated from air; and (transparent) acrylic resin (LOCTITE (trade name) and the like) which transmits the working wavelength.

UV hardening resin used for bonding an optical component is usually not preferable since UV does not transmit through silicon and a slider material. Upon UV irradiation from the side, the UV does not reach a bonded layer if it is thin, which is not preferable. Those of the type in which both base materials are linked and bonded together by volatilization of a solvent are not preferable, because their bonding layer is thin to a degree that makes it impossible for the solvent to be volatilized. Cyanoacrylate adhesive (instant adhesive) which is solidificated in response to moisture in the air or on the body surface is not preferable because the moisture cannot penetrates through the adhesive surface. A substrate direct joining method may be used for bonding the silicon bench 13 and the slider 11 together. In this method, two types of substrates made of different materials are directly pressed into contact with each other at their surfaces and then subjected to heating or the like to thereby join the atomic orders together. This method has advantage that it does not require an intermediate substance such as solder, adhesive bond, or the like.

As can be understood from the description above, the embodiments and the like described above include the following configuration of a recording head, a recorder, and the like. With this configuration, the recording head and the recorder provided therewith can be downsized and a small light spot can be obtained. The small light spot size then permits achieving higher recording density.

(A1) A micro-optical recording head which: uses light for information recording to a recording medium; and has: a slider that moves relative to the recording medium while floating thereon; and an optical waveguide which is provided in the slider and which has a refractive index difference of 20% or more between a core and a cladding.

(A2) The micro-optical recording head described in the (A1) above, further having a light source section that emits light of a near-infrared wavelength, in which a material of the core of the optical waveguide is silicon and the optical waveguide is integrated together with the slider (A3) The micro-optical recording head described in (A1) or (A2) above, further having a plasmon probe for near-field light generation at or near the light exit position of the optical waveguide, in which the plasmon probe is formed of an antenna or an aperture having a vertex of 20 nm or less in radius of curvature.

(B1) A micro-optical recorder comprising the micro-optical recording head described in any one of the (A1) to (A3) above.

(C1) An optically assisted magnetic recording head comprising the micro-optical recording head described in the (A1) and (A2) above, further having a magnetic recording element.

(C2) The optically assisted magnetic recording head described in the (C1) above, further having a plasmon probe for near-field light generation at or near the light exit position of the optical waveguide, in which the plasmon probe is formed of an antenna or an aperture having a vertex of 20 nm or less in radius of curvature.

(D1) An optically assisted magnetic recorder comprising the optically assisted magnetic recording head described in the (C1) or (C2) above.

According to the present invention, a slider has an optical waveguide having a refractive index difference of 20% or more between the core and the cladding, thereby permitting downsizing of a recording head and a recorder provided therewith and also permits providing a small light spot. Then, this small light spot size permits achieving higher recording density.

Now, the reasons why the refractive index difference is large as described above will be described. Upon formation of an optical waveguide, a decrease in the core diameter result in a decrease in the mode field diameter (diameter of waveguided light and hereinafter indicated as "MFD" as appropriate) dependent on this core diameter. However, when the core diameter reaches a defined value or less, the amount of light leaking from the core increases dramatically, and as a result, the MFD also conversely increases as the core diameter decreases. Therefore, a change in the MFD depending on a change in the core diameter has a minimum value (hereinafter indicated as "$MFD_{min}$"). This $MFD_{min}$ is dependent on the refractive index difference between the core and the cladding; thus, the larger the refractive index difference is, the smaller value of the $MFD_{min}$ is. With a refractive index difference for an typical optical fiber or the like, the $MFD_{min}$ is approximately 5 μm, while with a refractive index difference of 20%, the $MFD_{min}$ is approximately 1 μm, thus permitting formation of a small light spot, which in turn permits high density recording.

Moreover, when the plasmon probe is at the exit end of the optical waveguide, the size of this plasmon probe is approximately 400 nm when the plasmon probe is triangular-shaped. When the size of the light spot (the minimum value is defined by the $MFD_{min}$ for the optical waveguide) is 5 μm, most of the light is not irradiated to the plasmon probe, thus resulting in remarkable deterioration in the light utilization efficiency. When the refractive index difference is 20% and the $MFD_{min}$ is 1 μm, the efficiency largely improves. If the refractive index difference is 40% and the MFD$_{min}$ is 0.5 μm, most of the light is irradiated to the probe, thus permitting providing even more desirable effect.

The use of silicon as a material of the core of the optical waveguide can provide a larger refractive index difference between the core and the cladding, thus providing a micro spot (that is, high energy density) with simple configuration, which makes it easy to manufacture the optical waveguide. The use of a plasmon probe formed of an antenna or an aperture having a vertex of 20 nm or less in radius of curvature permits an even smaller light spot size, which is advantageous for high density recording.

What is claimed is:

1. A recording head which uses light for information recording to a recording medium, comprising:
    a slider which has a structure to move relative to the recording medium while floating thereon; and
    an optical waveguide which is provided in the slider, wherein the optical waveguide comprises a core and a cladding and the optical waveguide has a refractive index difference of 20% or more between the core and the cladding, wherein the core has a first portion at a light output side of the optical waveguide and a second portion at a light input side of the optical waveguide, wherein the first portion extends along a direction in which light is guided within the optical waveguide and the first portion has 1) a width that is constant along a first direction perpendicular to the direction in which light is guided within the optical waveguide and 2) a height that is constant along a second direction that is perpendicular to both the first direction and the direction in which light is guided within the optical waveguide, and wherein the second portion extends along the direction in which light is guided within the optical waveguide and the second portion has a width that widens in the direction in which light is guided within the optical waveguide.

2. The recording head according to claim 1, wherein a material of the core of the optical waveguide is silicon.

3. The recording head according to claim 1, further comprising a magnetic recording element which performs information writing by magnetism, or a magnetic reproduction element which performs information reading by magnetism.

4. The recording head according to claim 1, further comprising a plasmon probe for near-field light generation at or near a light exit position of the optical waveguide.

5. The recording head according to claim 4, wherein the plasmon probe is formed of an antenna or an aperture having a vertex of 20 nm or less in radius of curvature.

6. The recording head according to claim 1, further comprising a light source section which emits light of a near-infrared wavelength.

7. The recording head according to claim 6, further comprising a deflecting element which deflects light from the light source section toward the optical waveguide.

8. The recording head according to claim 7, wherein the deflecting element is a prism.

9. A recorder comprising:
    a recording head comprising:
    a slider which has a structure to move relative to the recording medium while floating thereon; and
    an optical waveguide which is provided in the slider, wherein the optical waveguide comprises a core and a cladding and the optical waveguide has a refractive index difference of 20% or more between the core and the cladding, wherein the core has a first portion at a light output side of the optical waveguide and a second portion at a light input side of the optical waveguide, wherein the portion extends along a direction in which light is guided within the optical waveguide and the portion has 1) a width that is constant along a first direction perpendicular to the direction in which light is guided within the optical waveguide and 2) a height that is constant along a second direction that is perpendicular to both the first direction and the direction in which light is guided within the optical waveguide, and wherein the second portion extends along the direction in which light is guided within the optical waveguide and the second portion has a width that widens in the direction in which light is guided within the optical waveguide; and
    a recording medium to which information is recorded by the recording head.

10. A recording head which uses light for information recording to a recording medium, comprising:
    a slider which has a structure to move relative to the recording medium while floating thereon;
    an optical waveguide provided in the slider, wherein the optical waveguide comprises a core and a cladding; and
    a plasmon probe for near-field light generation provided at or near a light exit position of the optical waveguide, wherein the core of the optical waveguide has a first portion at the light exit position and a second portion at a light input position of the optical waveguide, wherein the first portion extends along a direction in which light is guided within the optical waveguide and the first portion has 1) a width that is constant along a first direction perpendicular to the direction in which light is guided within the optical waveguide and 2) a height that is constant along a second direction that is perpendicular to both the first direction and the direction in which light is guided within the optical waveguide, and wherein the second portion extends along the direction in which light is guided within the optical waveguide and the second portion has a width that widens in the direction in which light is guided within the optical waveguide.

11. The recording head according to claim 10, wherein the optical waveguide has a refractive index difference of 20% or more between the core and the cladding.

12. A recording head which performs information recording to a recording medium, comprising:
    a slider which has a structure to move relative to the recording medium while floating thereon;
    an optical waveguide provided in the slider, wherein the optical waveguide comprises a core and a cladding;
    a plasmon probe for near-field light generation so provided as to face the recording medium at or near a light exit position of the optical waveguide; and
    a magnetic recording element which has a structure to perform information writing by magnetism, wherein the core of the optical waveguide has a first portion at the light exit position and a second portion at a light input position of the optical waveguide, wherein the first portion extends along a direction in which light is guided within the optical waveguide and the first portion has 1) a width that is constant along a first direction perpendicular to the direction in which light is guided within the optical waveguide and 2) a height that is constant along a second direction that is perpendicular to both the first direction and the direction in which light is guided within the optical waveguide, and wherein the second portion extends along the direction in which light is guided within the optical waveguide and the second portion has a width that widens in the direction in which light is guided within the optical waveguide.

13. The recording head according to claim 12, wherein the optical waveguide has a refractive index difference of 20% or more between the core and the cladding.

14. The recording head according to claim 13, wherein the information recording to the recording medium is performed by heat generated by light from the plasmon probe and by magnetism generated by the magnetic recording element.

15. The recording head according to claim 1, wherein the core of the optical waveguide defines a diameter of wave-guided light to 1 μm or less at the light output side.

16. The recording head according to claim 1, wherein the optical waveguide comprises a sub-core having a refractive index between refractive indexes of the core and the cladding.

17. The recording head according to claim 16, wherein a material of the core of the optical waveguide is Si, a material of the sub-core of the optical waveguide is SiON, and a material of the cladding of the optical waveguide is $SiO_2$.

18. The recorder according to claim 9, wherein the core of the optical waveguide defines a diameter of wave-guided light to 1 μm or less at the light output side.

19. The recorder according to claim 9, wherein the optical waveguide comprises a sub-core having a refractive index between refractive indexes of the core and the cladding.

20. The recorder according to claim 19, wherein a material of the core of the optical waveguide is Si, a material of the sub-core of the optical waveguide is SiON, and a material of the cladding of the optical waveguide is $SiO_2$.

21. The recording head according to claim 10, wherein the core of the optical waveguide defines a diameter of wave-guided light to 1 μm or less at the light output side.

22. The recording head according to claim 10, wherein the optical waveguide comprises a sub-core having a refractive index between refractive indexes of the core and the cladding.

23. The recording head according to claim 22, wherein a material of the core of the optical waveguide is Si, a material of the sub-core of the optical waveguide is SiON, and a material of the cladding of the optical waveguide is $SiO_2$.

24. The recording head according to claim 12, wherein the core of the optical waveguide defines a diameter of wave-guided light to 1 μm or less at the light output side.

25. The recording head according to claim 12, wherein the optical waveguide comprises a sub-core having a refractive index between refractive indexes of the core and the cladding.

26. The recording head according to claim 25, wherein a material of the core of the optical waveguide is Si, a material of the sub-core of the optical waveguide is SiON, and a material of the cladding of the optical waveguide is $SiO_2$.

27. The recording head according to claim 1, wherein the optical waveguide further comprises a subcore that extends from the light input side to an interior portion of the cladding, wherein the second portion is contained within the subcore.

28. The recorder according to claim 9, wherein the optical waveguide further comprises a subcore that extends from the light input side to an interior portion of the cladding, wherein the second portion is contained within the subcore.

29. The recording head according to claim 10, wherein the optical waveguide further comprises a subcore that extends from the light input position to an interior portion of the cladding, wherein the second portion is contained within the subcore.

30. The recording head according to claim 12, wherein the optical waveguide further comprises a subcore that extends from the light input position to an interior portion of the cladding, wherein the second portion is contained within the subcore.

* * * * *